United States Patent
Luckay et al.

(10) Patent No.: US 12,093,879 B2
(45) Date of Patent: Sep. 17, 2024

(54) SYSTEMS FOR AUTONOMOUS ITEM DELIVERY

(71) Applicant: United States Postal Service, Washington, DC (US)

(72) Inventors: Ryan Luckay, Washington, DC (US); Robert E Dixon, Jr., Washington, DC (US); Gregory Cooil, Washington, DC (US)

(73) Assignee: United States Postal Service, Washington, DC (US)

( * ) Notice: Subject to any disclaimer, the term of this patent is extended or adjusted under 35 U.S.C. 154(b) by 166 days.

(21) Appl. No.: 15/832,245

(22) Filed: Dec. 5, 2017

(65) Prior Publication Data

US 2018/0158018 A1 Jun. 7, 2018

Related U.S. Application Data

(60) Provisional application No. 62/430,304, filed on Dec. 5, 2016.

(51) Int. Cl.
*G06Q 10/0832* (2023.01)
*B64C 39/02* (2023.01)
(Continued)

(52) U.S. Cl.
CPC ....... *G06Q 10/0832* (2013.01); *B64C 39/024* (2013.01); *G01C 21/343* (2013.01);
(Continued)

(58) Field of Classification Search
CPC .. G06Q 10/0832; G06Q 10/087; G06Q 10/08; G06Q 10/083; G06Q 50/30;
(Continued)

(56) References Cited

U.S. PATENT DOCUMENTS 9,792,576 B1 * 10/2017 Jamjoom .............. B64C 39/024
9,815,633 B1 * 11/2017 Kisser .................... B25J 9/0093
(Continued)

OTHER PUBLICATIONS

Ben Coxworth; "HorseFly delivery drone would use a van as its base-on-the-go"; Jun. 6, 2014; New Atlas; https://newatlas.com/horsefly-uav-delivery-drone/32441/ (Year: 2014).*
(Continued)

*Primary Examiner* — Omar Zeroual
*Assistant Examiner* — Jorge G Del Toro-Ortega
(74) *Attorney, Agent, or Firm* — Morgan, Lewis & Bockius LLP

(57) ABSTRACT

Methods and systems for autonomous item delivery and/or pick up are provided. IN some aspects, a mothership travels along an item route. One or more autonomous delivery vehicles may be dispatched from the mothership as the mothership progresses along the route. Each of the autonomous delivery vehicles may deliver and/or pick-up one or more items at one or more item locations. In addition, as the mothership progresses along its route, it may also stop to facilitate the manual delivery and/or pick-up of additional items via a human operator. Upon completing their delivery and/or pick up tasks, the autonomous delivery vehicles return to the mothership, either at the point at which they dispatched from the mothership, or at a different location along the item delivery route.

18 Claims, 18 Drawing Sheets

(51) Int. Cl.
  *B64U 80/86* (2023.01)
  *B64U 101/60* (2023.01)
  *G01C 21/34* (2006.01)
  *G05D 1/00* (2024.01)

(52) U.S. Cl.
  CPC ......... *G05D 1/0027* (2013.01); *G05D 1/0088* (2013.01); *G05D 1/0217* (2013.01); *G05D 1/104* (2013.01); *B64U 80/86* (2023.01); *B64U 2101/60* (2023.01); *B64U 2201/104* (2023.01); *G01C 21/3469* (2013.01)

(58) Field of Classification Search
  CPC ................ G06Q 10/06; G06Q 50/28; G06Q 10/063114; G06Q 10/0835; G06Q 10/08355; G06Q 20/321; G06Q 30/0283; G06Q 30/0633; G06Q 30/0635; G06Q 40/08; G06Q 10/02; G06Q 10/06315; G06Q 10/0833; G06Q 10/0836; G06Q 10/1095; G06Q 20/308; G06Q 20/3274; G06Q 20/367; G06Q 2220/00; G06Q 30/0185; G06Q 30/0639; G06Q 30/0641; B64C 39/024; B64C 2201/128; B64C 2201/145; B64C 2201/208; G05D 1/0027; G05D 1/0088; G05D 1/0217; G05D 1/104; G05D 2201/0213; G05D 1/0214; G05D 1/0022; G05D 1/0274; G05D 1/0061; G05D 1/0212; G05D 1/0231; G05D 1/0291; G05D 1/0038; G05D 1/0094; G05D 1/0033; G05D 1/0055; G05D 1/0221; G05D 1/0223; G05D 1/024; G05D 1/0257; G05D 1/0287; G05D 1/0289; G05D 1/0297; G05D 2201/0201; G05D 2201/0212; G05D 2201/0216; G05D 1/00; G05D 1/0011; G05D 1/0016; G05D 1/0044; G05D 1/005; G05D 1/0202; G05D 1/0206; G05D 1/0251; G05D 1/0276; G05D 1/0285; G05D 1/0293; G05D 1/0295; G05D 1/042; G05D 1/106; G05D 1/12; G05D 2201/0207; G01C 21/3469

See application file for complete search history.

(56) References Cited

U.S. PATENT DOCUMENTS

| | | | |
|---|---|---|---|
| 9,915,956 B2* | 3/2018 | Bokeno | B64F 1/362 |
| 10,245,993 B1* | 4/2019 | Brady | B60P 7/13 |
| 10,303,171 B1* | 5/2019 | Brady | G05D 1/0297 |
| 10,387,825 B1* | 8/2019 | Canavor | H04W 4/024 |
| 2015/0349917 A1* | 12/2015 | Skaaksrud | G06Q 10/087 370/328 |
| 2015/0370251 A1* | 12/2015 | Siegel | G05D 1/00 701/2 |
| 2015/0379468 A1* | 12/2015 | Harvey | G06Q 10/08355 705/338 |
| 2016/0200438 A1* | 7/2016 | Bokeno | B64F 1/362 244/2 |
| 2016/0207637 A1* | 7/2016 | Campillo | B64C 39/024 |
| 2016/0239802 A1* | 8/2016 | Burch, V | G01F 17/00 |
| 2016/0364989 A1* | 12/2016 | Speasl | G08G 5/0082 |
| 2017/0124547 A1* | 5/2017 | Natarajan | G06Q 20/202 |
| 2017/0313421 A1* | 11/2017 | Gil | G06Q 10/0832 |
| 2019/0220819 A1* | 7/2019 | Banvait | G01C 21/3453 |

OTHER PUBLICATIONS

Murray, Chase; "The flying sidekick traveling salesman problem: Optimization of drone-assisted parcel delviery", Mar. 2015; Elsevier; Transportation Research Part C: Emerging Technologies; vol. 54; pp. 86-108 (Year: 2015).*

* cited by examiner

SYSTEMS FOR AUTONOMOUS ITEM DELIVERY

INCORPORATION BY REFERENCE OF ANY PRIORITY APPLICATIONS

Any and all applications for which a foreign or domestic priority claim is identified in the Application Data Sheet as filed with the present application are hereby incorporated by reference under 37 CFR 1.57. This Application claims the benefit of priority to U.S. Application No. 62/430,304, filed Dec. 5, 2016, the entire contents of which are hereby incorporated by reference.

FIELD

Embodiments relate generally to automated movement and delivery of items that uses unmanned delivery or pick-up transportation devices.

DESCRIPTION OF THE RELATED TECHNOLOGY

Personnel expenses can be a major source of expense for item distribution networks. Personnel expenses include not only direct salaries of personnel, but also their benefits, such as health insurance, work space costs, pension benefits, and the like.

The sophistication of computer programs continues to expand, enabling greater and greater capabilities with respect to automating tasks previously performed by human operators. Computer automation provides several advantages over the use of humans to perform similar tasks. When properly configured, computers may perform routine and conventional activities more reliability than humans and at a much reduced cost. In addition, cost trends for computer based automation are favorable, whereas costs for maintaining a workforce based on manual performance of tasks is becoming less and less competitive. Therefore, there is a need to automate additional tasks performed by a distribution network to reduce costs, increase reliability and overall quality.

SUMMARY

Methods and systems disclosed provide for automation of item delivery and or pick-up via the use of autonomous delivery units (ADUs), and/or a "mothership" that can deliver the ADUs to locations from which the ADUs may perform their delivery and/or pick-up functions. Items transferred and/or delivered by the systems and methods described herein can be various types of items, for example, parcels, packages, crates, boxes, envelopes, flats, cards, or other items transported by a distribution network such as a postal network, a delivery service, or the like.

The mothership may include a location for storage of one or more ADUs. While stored on the mothership, the ADUs may receive power for recharging their batteries. The ADUs may also interface with a computer on-board the mothership, from which the ADUs may receive instructions for performing one or more item deliveries and/or pick-ups. The mothership may be equipped with a loading ramp, from which the ADUs may exit the mothership and travel to their assigned item pick-up and/or drop off locations. Upon completion of their assignments, the ADUs may return to the mothership. In some aspects, while the ADUs are out performing their assignments, the mothership may continue along an item delivery route, for example, to facilitate delivery of other items via either autonomous or manual means. Thus, in some aspects, the ADUs may return to the mothership by transiting to a location different from the location from which they departed the mothership.

The disclosed methods and systems may receive a set of item delivery transactions and divide the transactions into those that will be delivered by a human item carrier and those that will be delivered and/or picked-up by an ADU. The ADU transactions may then be ordered, and a contiguous set of ADU transactions within the order may be selected for execution via an ADU. In some aspects, the set of transactions to be executed by an ADU may be based on a number of ADUs available in the mothership.

In one aspect, a system for autonomous item delivery, comprises a mothership, comprising: a freight bay, configured to store one or more autonomous delivery units (ADUs); a scheduling and control computer, configured to: identify a set of item transactions along an item route, each item transaction comprising a delivery or a pick-up of an item at an item location; divide the set into a first set of manual item transactions and a second set of autonomous item transactions for execution by the one or more ADUs; determine ADU departure and return locations based on the first set and the second set; generate a mothership manifest indicating the transactions in the first and second set; and communicate the item transactions in the second set to the one or more ADUs; and the one or more ADUs, each ADU configured to automatically: receive item information from the mothership; travel from the mothership to a location indicated by the item information; deliver or pick-up an item at the location indicated by the item information; and return to the mothership.

In some embodiments, the one or more ADUs comprise a GPS receiver.

In some embodiments, the mothership further comprises a mothership control computer, configured to autonomously control the mothership along the item route.

In some embodiments, the manifest indicates stop locations for item transactions in the first and second sets, and wherein the mothership control computer is further configured to stop the mothership at the stop locations associated with the first and second set of item transactions.

In some embodiments, the mothership further comprises manual driving controls to provide a means for an operator to operate the mothership along the item route.

In some embodiments, the mothership further comprises a ramp configured to allow ingress and egress by the ADUs to and from the freight bay.

In some embodiments, the mothership comprises automated loading means for loading an item onto an ADU.

In some embodiments, one or more of the ADUs comprises item loading means or item drop off means.

In some embodiments, the item loading means comprises a scoop.

In some embodiments, at least one of the autonomous delivery vehicles comprises a bed, and wherein the item drop off means comprises a bed lifting means.

In some embodiments, the mothership further comprises an item storage system located within the freight bay, and a robotic arm configured to retrieve and store items in the item storage system.

In some embodiments, the mothership further comprises a roof structure substantially enclosing the freight bay, and wherein the roof comprises an access portal to provide ingress and egress of aerial ADUs.

In some embodiments, the robotic arm is further configured to position an item for pick-up by an ADU via the access portal.

In some embodiments, the robotic arm is further configured to retrieve an item from an ADU via the access portal and store the item in the item storage system.

In another aspect, a computer-implemented method for automated transfer of items, the method comprises under control of one or more processors of a mothership, identifying a set of item transactions along an item route, each item transaction comprising a delivery or a pick-up of an item at an item location; dividing the set into a first set of manual item transactions and a second set of autonomous item transactions for execution by one or more autonomous delivery units (ADUs) located within the mothership; determining ADU departure and return locations based on the first set and the second set; generating a mothership manifest indicating the transactions in the first and second set; communicating a first item transaction of the second set to a first ADU of the one or more ADUs; at a first ADU departure location, causing the first ADU to leave the mothership to execute the first item transaction; and at a first ADU return location, causing the mothership to receive the first ADU subsequent to execution of the first item transaction.

In some embodiments, the first ADU return location is different from the first ADU departure location, and the method further comprises receiving, from the first ADU, a signal indicating that the first item transaction is complete; and sending a signal to the first ADU indicating the first ADU return location.

In some embodiments, the first item transaction comprises a delivery, and the method further comprises based at least in part on the mothership manifest, causing an automated loading mechanism of the mothership to retrieve a first item from a storage location within the mothership; and causing the automated loading mechanism to load the item onto the first ADU.

In some embodiments, the first item transaction comprises a pick-up, and the method further comprising, subsequent to the mothership receiving the first ADU causing an automated loading mechanism of the mothership to retrieve a first item from the first ADU; and causing the automated loading mechanism to place the first item into a storage location within the mothership.

In some embodiments, the first ADU is selected from the one or more ADUs based at least in part on a battery charge status of the first ADU.

In some embodiments, the method further comprises, subsequent to causing the mothership to receive the first ADU:

determining that a battery charge level of the first ADU is greater than or equal to a predetermined threshold; communicating a second item transaction of the second set to the first ADU; and at a second ADU departure location, causing the first ADU to leave the mothership to execute the second item transaction.

BRIEF DESCRIPTION OF THE DRAWINGS

In the figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present disclosure. However, one having ordinary skill in the art should recognize that the disclosure can be practiced without these specific details. In some instances, circuits, structures, and techniques have not been shown in detail to avoid obscuring the present disclosure.

Figure 1:
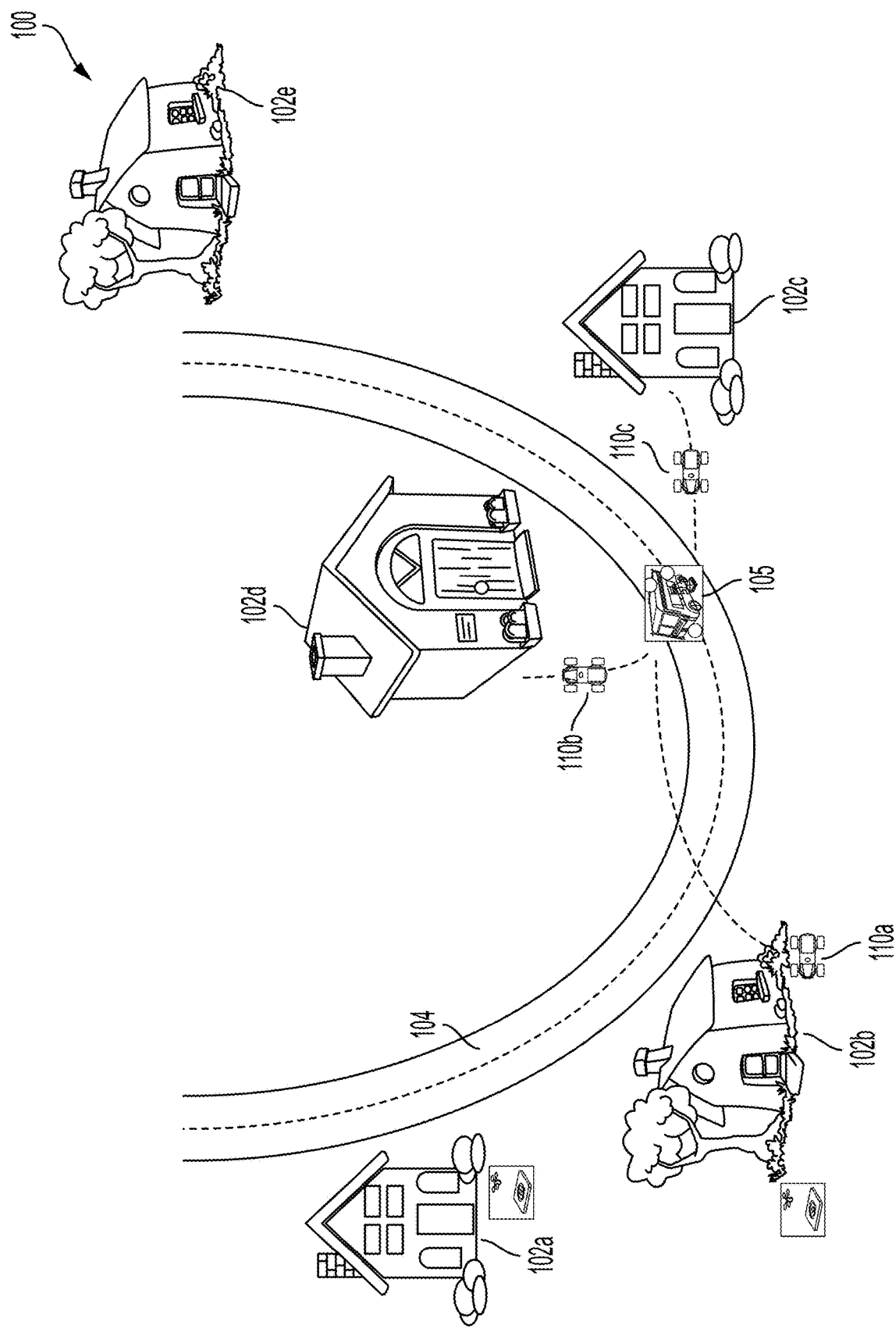
FIG. 1 is an overview diagram of an exemplary automated delivery system.

FIG. 1 is an overview diagram of an exemplary automated delivery system 100. The environment shown in FIG. 1 includes several item origins or delivery points 102a-e (e.g. in FIG. 1 shown as dwellings) along an item delivery route 104. A mothership 105 travels along the item delivery route 104. In some aspects, the mothership 105 may drive to the item delivery route 104 in response to receiving a request for an item delivery or pick-up. In some aspects, a wireless communication link between the mothership 105 and a pick-up/delivery management system may enable information regarding item delivery and/or pick-up requests to be transmitted to the mothership 105 in real time. In some aspects, the pick-up and/or delivery requests transmitted to the mothership may be selected by the pick-up/delivery management system based on a location of the mothership 105. For example, the pick-up/delivery management system may select a mothership nearest a requested pick-up/delivery location. Other mothership selection parameters are also contemplated.

Along the item delivery route 104, the mothership 105 may deploy one or more autonomous delivery units 110a-c. For example, the mothership 105 may come to a stop at a predetermined location along the item delivery route 104 for deployment. In some embodiments, the mothership 105 may stop at the first delivery point and deploy the ADUs 110a-c along the delivery route 104. In some embodiments, the mothership 105 may stop at an intermediate delivery point, such as at delivery point 102c, and deploy the ADUs 110a-c behind and forward along the delivery route 104. In some embodiments, the mothership 105 may stop at the end point, for example, at delivery point 102e, and deploy the ADUs 110a-c back along the delivery route 104. In another example, one or more autonomous delivery units 110a-c may be deployed while the mothership 105 continues moving along the item delivery route 104 so as to reduce or eliminate starting and stopping by the mothership 105 along the item delivery route 104. The autonomous delivery units 110a-c may then drive autonomously from a storage position within the mothership 105, to a delivery point or pick up point associated with the item origins or delivery points 102a-e. Upon either delivering an item or picking up an item at the item origins/destinations 102a-c, the autonomous delivery units 110a-c may return to the mothership 105 and return to a storage location (not shown) within the mothership 105.

While the example of FIG. 1 shows autonomous delivery units that drive over the ground, in some aspects, the autonomous delivery units may fly from the mothership 105 to the item origins/destinations 102a-e, as described elsewhere herein. For example, the autonomous delivery units may include wheeled or tracked ground-based vehicles, aircraft such as autonomous helicopters, or a combination of ground-based vehicles and aircraft.

Figure 2A:
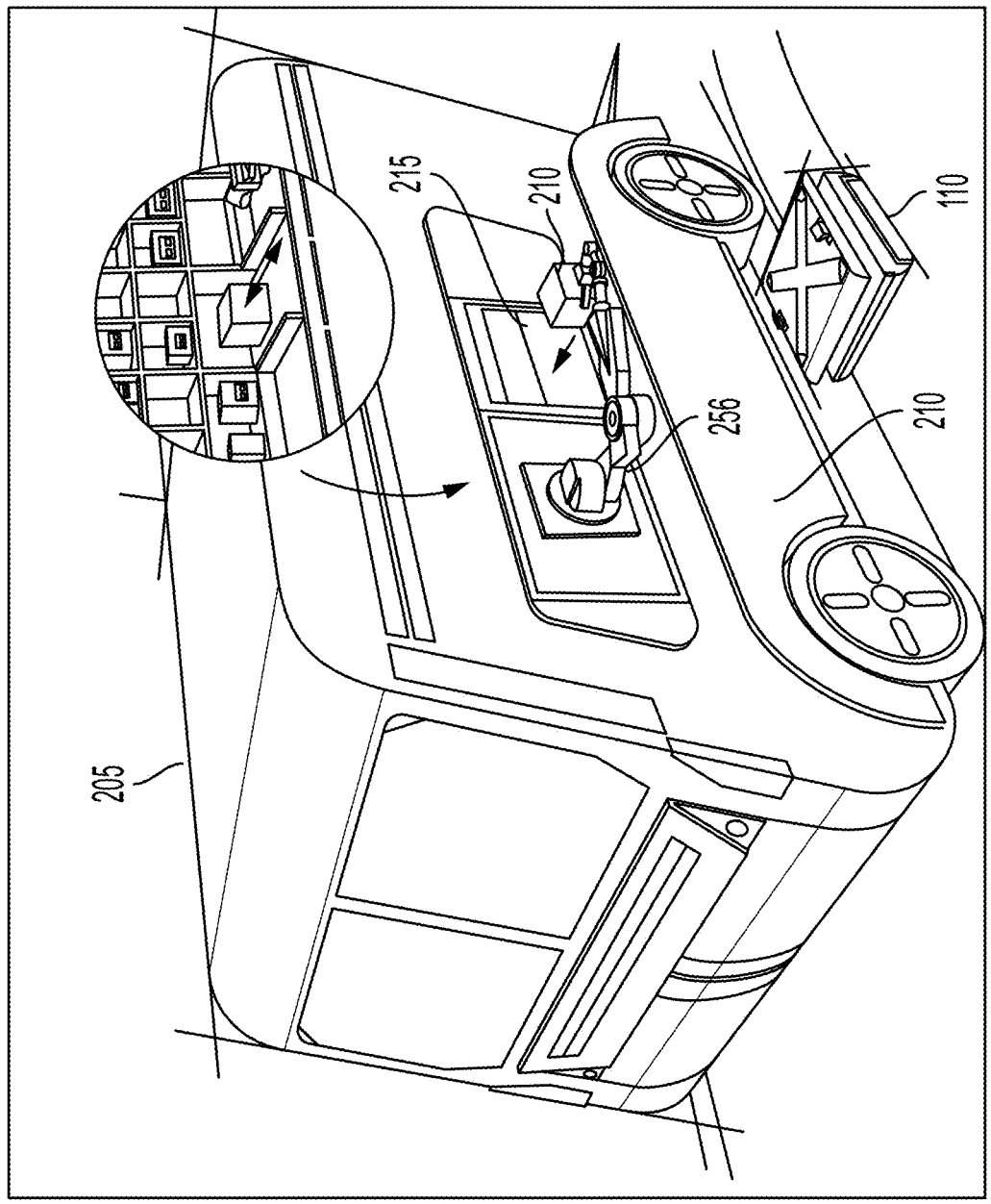
FIG. 2A is a perspective view of an exemplary mothership.

FIG. 2A shows an exemplary mothership, with an inset depicting a portion of the internals of the mothership 205, which is described elsewhere herein The mothership 205 includes an ability to load and unload items to/from an autonomous delivery unit (ADU) 110 while the ADU 110 is positioned outside the mothership 205. The ADU 110 can be stored in the mothership 205 until they are ready to be used, and can be summoned by the mothership 205 to receive an item 210 as required. The ADU 110 will be described in greater detail elsewhere herein, for example, with reference to FIG. 6C. The loading and unloading of the ADU 110 may be accomplished in some aspects, via a loading arm 256. The loading arms 205 may access an item 210, which is stored internally to the mothership 205, via an access portal 215. After the loading arm 205 places the item 210 on the ADU 110, the ADU may autonomously move to an item destination, such as one of the item origins or delivery points 102a-e shown in FIG. 1. In some aspects, the mothership 205 may include one or more charging bays (not shown) internally.

The mothership 205 may be capable of either manual control and/or automated control. In some cases, the mothership may be controlled by a human operator, and thus may be equipped with traditional driving controls such as a steering wheel, accelerator, brake pedal, and the like. In some aspects, the mothership 205 may be configured into a separate autonomous mode, where input from the steering wheel, accelerator, and brake are given less than 100% control of the mothership 205, and control of the mothership 205 is at least partially controlled by an autonomous driving controller (not shown).

In some aspects, the mothership 205 may be electrically powered, and may not rely on the use of carbon based fuels for propulsion. In other aspects, the mothership 205 may be equipped with a hybrid drivetrain or a traditional internal combustion engine based drive train (gas or diesel for example).

Figure 2B:
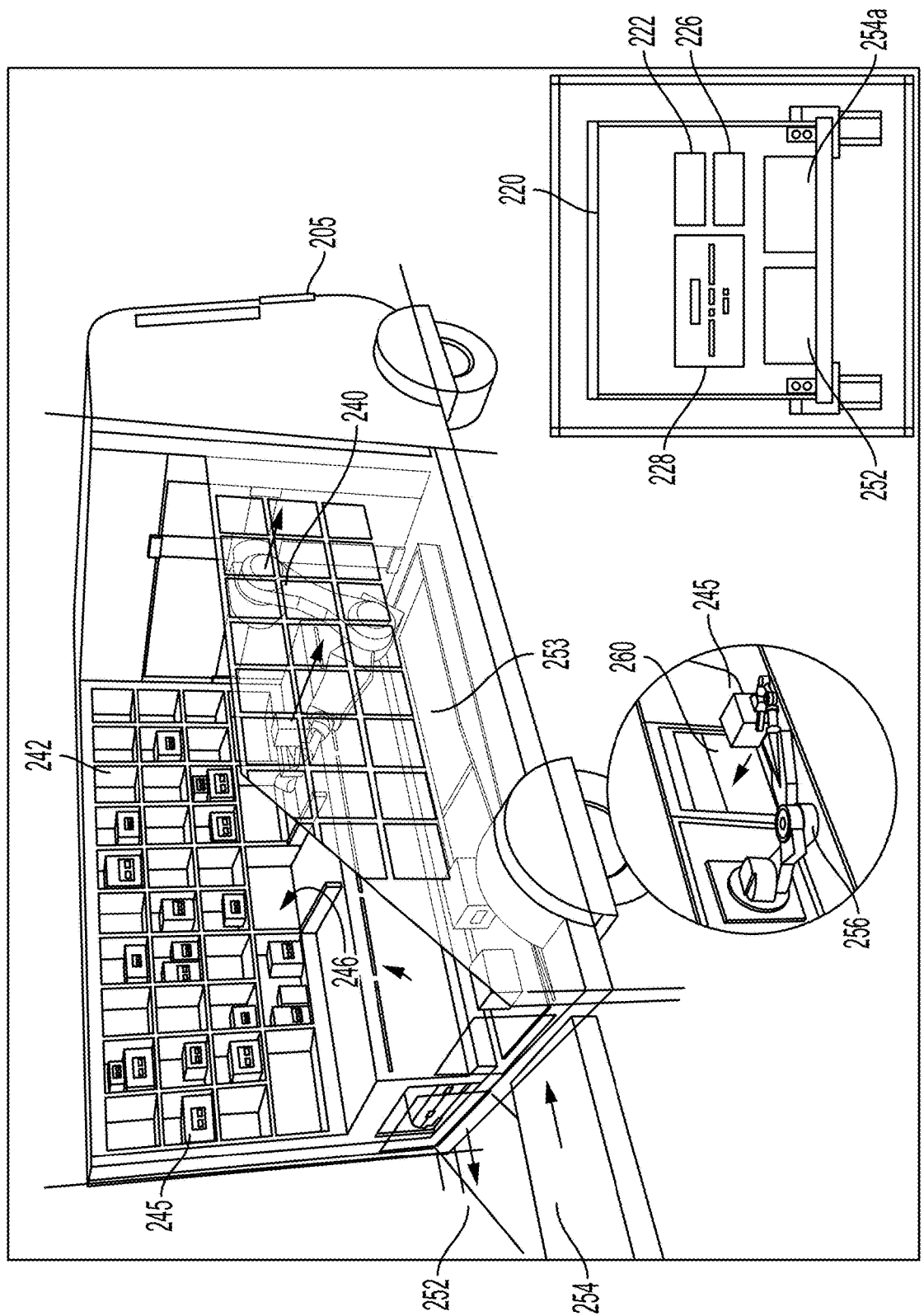
FIG. 2B is partial cutaway view of an exemplary mothership.

FIG. 2B is a partial cutaway view of the mothership 205 with insets depicting the exterior of the mothership 205 and the rear of the mothership 205. The mothership 205 includes an item storage system 242 that provides for internal storage of items that are to be delivered by the mothership 205 or picked up by the mothership 205. A first robotic arm 240 is positioned internally to the mothership with access to the item storage system 242, including a plurality of item storage bins 245. The first robotic arm 240 can be articulated and include a picking mechanism attached to an end of the first robotic arm 240. The picking mechanism can pick an item 245 from the item storage system 242, and place the item 245 on a staging area 246 inside the mothership 205.

FIG. 2B also illustrates the loading arm 256 attached to the mothership 205 but also positioned external to the mothership 205. The loading arm 256 may be configured to move the item 245 from a position external to the mothership 205 through an access portal 260 in the case of an item pick-up. The access portal 260 may provide access to the conveyer system 253 within the mothership 205. After the item 245 is deposited on the conveyer system 253 via the access portal 260 by the loading arm 256, the first robotic arm 240 may store the item 258 in the item storage system 242. Similarly, the loading arm 256 may be configured to retrieve an item from the conveyer system 253, or from the staging area 246 and deposit the item outside the mothership 205, for example, onto an ADU 110, in the case of delivery. The loading arm 256 may be similar to the robotic arm.

In some embodiments, the first robotic arm 240 may be configured to dispense items for delivery from the item storage system 242 to the outbound portion 252 of a conveyer system 253. The first robotic arm 240 may be configured to receive items from pick-up via an inbound portion 254 of the conveyer system 253, and store the item in the item storage system 242. The outbound portion 252 can include a storage area within the mothership 205 where ADUs 110 await receipt of an item from the first robotic arm 240, which can place the item on the ADU 110 while the ADU 110 is inside the mothership 205. The ADU 110 then departs the mothership 205 via a ramp on the outbound portion 252. When the ADU 110 has picked up an item, the ADU returns to the mothership by driving up a ramp extending from the ground to the mothership 205 in the inbound portion 245.

In some embodiments, the first robotic arm 240 picks the item 245 from the ADU 110 while the ADU 110 is near the inbound portion 254, but without the ADU 110 driving into the mothership 205. In some embodiments, the ADU 110 drives to the inbound portion 254, and aligns with an inbound access door 254a. The ADU uses a conveyor belt on the ADU 110 (not shown) to move the item 245 through the inbound access door 254a and onto the conveyor belt 253. The first robotic arm 240 then picks the item 245 from the conveyer system 253, and places the item 245 in the item storage system 242.

FIG. 2B also shows an embodiment of an automated retail hotspot 220 that can be integrated into the mothership 205. This embodiment of the automated retail hotspot 220 is positioned at the rear of the mothership 205. Other embodiments integrating the automated retail hotspot 220 into a side or front portion of the mothership 205 are also contemplated. The hotspot 220 includes an item drop off slot 222 and an item pick up dispenser 226. The automated retail hotspot 220 also includes a touch screen display 228. Via the touch screen display 228, a user may indicate an item for drop off, and use the drop off slot 222 to deposit the item within the mothership 205. In some aspects, the first robotic arm 240 may retrieve the deposited item from the drop off slot 222, based on input received from the touch screen 228. The first robotic arm 240 may be configured to store the item in the item storage system 242 based on input received from the touch screen 228. The touch screen display 228 may also be configured to display a user interface soliciting input from a user. The input may identify an item for pick up by the user. Based on input received via the touch screen display, the first robot arm 240 may be configured to retrieve the specified item from the item storage system 242 and dispense the item via the item pick up dispenser 226 to the user.

Figure 2C:
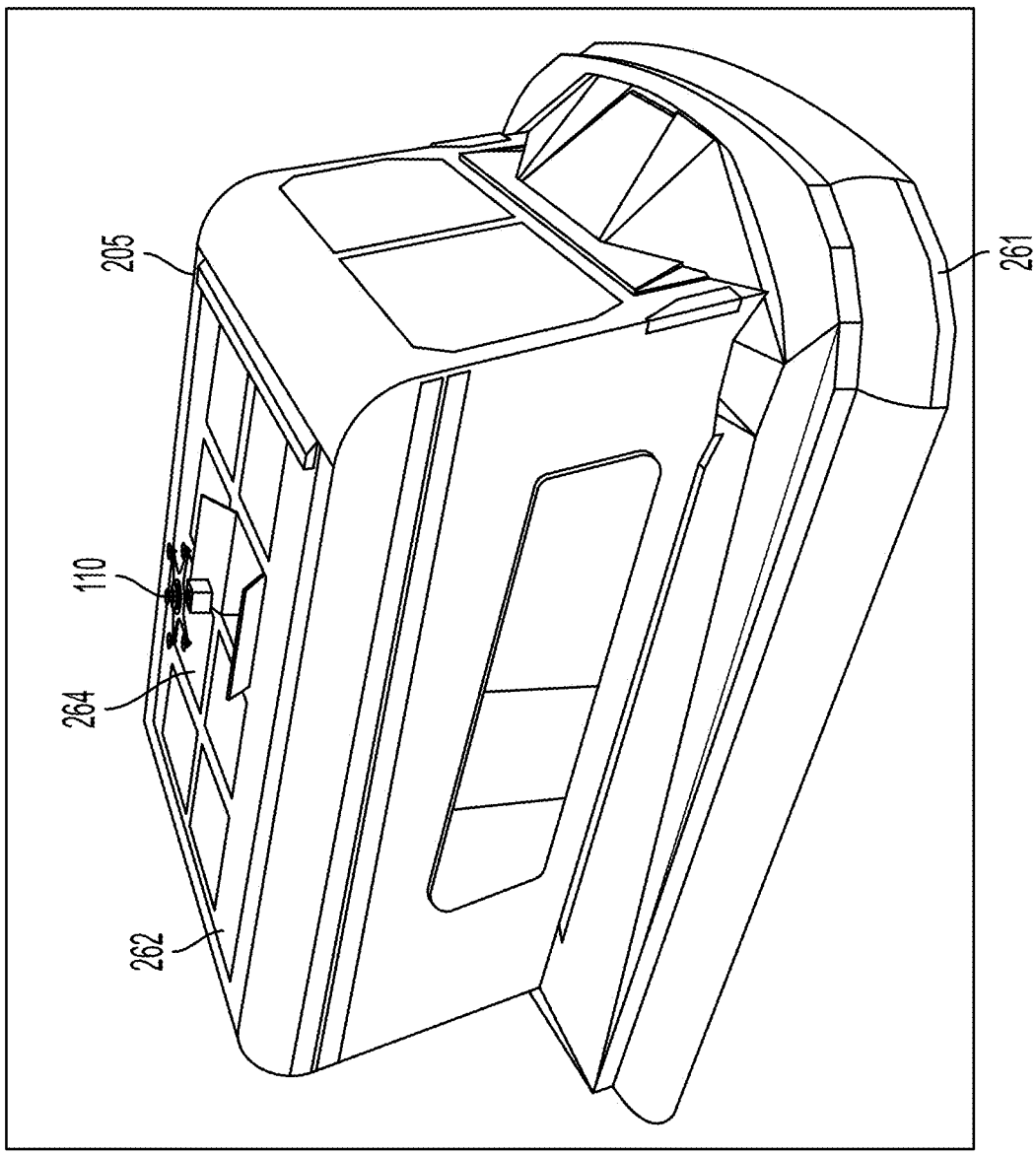
FIG. 2C is a perspective view of an exemplary mothership.

FIG. 2C shows an exemplary mothership. The exemplary mothership 205 of FIG. 2C is a hovercraft, including a skirt 261. A person of skill in the art will understand that the mothership 205 configured for aerial ADU 110 use can be a land based vehicle, without departing from the scope of this disclosure. The mothership 205 of FIG. 2C also includes a plurality of top hatches 262 and is configured for use with aerial ADUs 110. FIG. 2C illustrates how an item 264 may be picked-up from or delivered to the mothership 205 via an aerial ADU 110. The mothership 205 of FIG. 2C may be equipped with the robotic item delivery system illustrated in FIG. 2B. For example, the first robotic arm 240 may be configured to retrieve the item 264 from the ADU 110 via a top hatch 262. The first robotic arm 240 may then store the retrieved item 264 in the item storage system 242, which may be integrated within the mothership of FIG. 2C in a similar manner to that shown in FIG. 2B. The first robotic arm 240 may also be configured to retrieve an item 264 from the item storage system 242, and position the item 264 at a location in proximity to the top hatch 262, such that the ADU 110 may pick-up the item 264 for delivery from the location.

Although the mothership embodiments depicted in FIGS. 2A-2C individually include a variety of components and functions, a mothership can include any combination or subset of the components and functionalities described above with reference to FIGS. 2A-2C without departing from the scope of the present disclosure.

Figure 3:
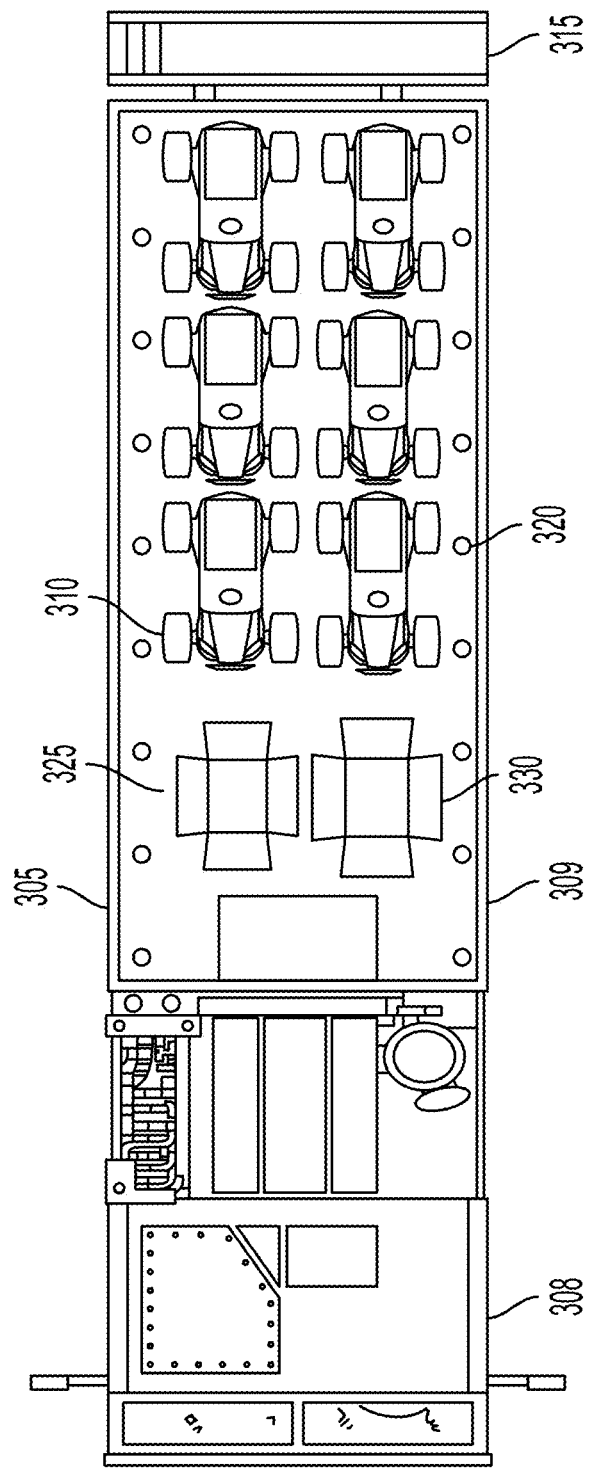
FIG. 3 is a schematic view of an exemplary mothership having ground based ADUs.

FIG. 3 is a schematic view of an exemplary mothership. The mothership 305 includes a cab 308 and a freight bay 309. The freight bay 309 may be configured to provide storage locations for one or more ADUs 310. The mothership 105 may also include a deployable ramp 315. The deployable ramp 315 may be configured to allow one or more of the ADUs 310 to exit the mothership 305. The deployable ramp 315 may be deployed via a push of a button positioned within the cab 305 or other control input by an operator in the cab 305, or automatically. This may allow an operator of the mothership 305 to deploy the ADUs 310 without exiting the cab 308, and in some aspects, without leaving a driving seat positioned within the cab 308.

In some aspects, the mothership 105 may also be equipped with power units 320, such as wireless power units. The power units 320 may be configured to recharge batteries in one or more of the ADUs 310 stored in the freight bay 309. The mothership 305 may also include one or more pick up boxes 325 in the freight bay 309. The pick-up boxes 325 may be utilized for storage of items until the items are loaded onto one of the ADUs 310.

The mothership 305 may also include one or more drop-off boxes 330 in the freight bay 309 where items to be delivered are stored. In some embodiments, the drop-off boxes 330 and pick-up boxes 325 can be storage areas within the freight bay 309. The mothership 305 may be dispatched to a location within a range of an ADU 310 to a delivery point. The item may then be loaded from the drop off box 330 to one of the ADUs 310. This loading operation may be performed manually by a human operator, or in some aspects, the mothership 105 may be equipped with automated loading apparatus to move the item from the drop off box 330 to the ADU 310 without human assistance, similar to that described with reference to FIGS. 2A-2C. For example, the mothership 305 of FIG. 3 may be equipped with a robotic arm 240 and item storage system 245, and optionally a conveyer system 253 as described above with respect to FIG. 2B in some aspects. The loaded ADU 310 may then exit the mothership 305 via the loading ramp 315, and transit to the delivery point. After delivery of the item, the ADU 110 may return to the mothership 105, and re-enter the freight bay 309 via the loading ramp 315. The ADU 110 may be configured to then autonomously place itself in a storage position within the freight bay 309, and may enable power recharging, such as wireless charging, via the power unit(s) 320.

The drop off boxes 330 may also provide a storage location for items available for a "drop off on demand" service. For example, a customer may place an order for an item after the mothership 305 has left a logistics center and is already loaded. However, the mothership 305 may be preloaded with high demand items, such as newly released electronics items, or other popular or high volume items, in one or more of the drop off boxes 330. Upon receipt of the order in real-time, the mothership may be pre-configured, due to the item being preloaded on the mothership 305, to fulfill the order without returning to a logistics center to obtain the item. Instead, the mothership 305 may be dispatched directly to a location in proximity to a delivery location specified in the received order.

Figure 4:
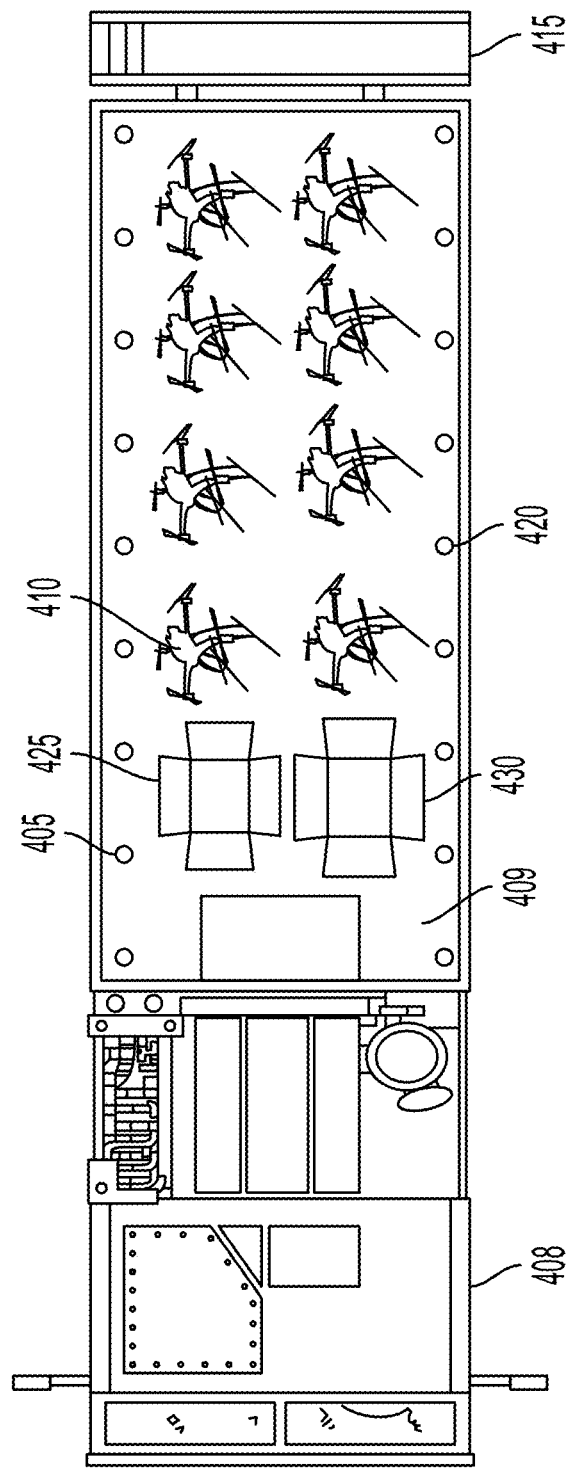
FIG. 4 is a schematic view of an exemplary mothership having flying ADUs.

FIG. 4 is a view of an exemplary mothership. The mothership of FIG. 4 shares some features of the mothership of FIG. 3. In particular, the mothership of FIG. 4 includes a cab 408, a freight bay 409, a loading ramp 415, power units 420, and pick-up and drop-off boxes 425 and 430. In some aspects, these features may provide similar functions as those described with respect to their respective counterparts described above with respect to FIG. 3. In contrast to the mothership of FIG. 3, the mothership of FIG. 4 includes automated delivery units (ADUs) 410 that are capable of airborne flight. Thus, whereas the ground based ADUs 310 of FIG. 3 must transit from the mothership 305 to a delivery or pick-up location via the ground, the ADUs 410 of FIG. 4 may fly from the mothership 405 to the delivery or pick-up location. In some aspects, the mothership 405 may include an opening to allow egress and ingress of the ADUs 410 via openings (not shown) in the top of the mothership 405. In some embodiments, the openings may be positioned in proximity to the loading ramp 415. In some aspects, the opening may be in a top or roof of the mothership 405. In some aspects, the freight bay 409 does not include a roof and, in some aspects, does not include sides, or the sides are of a height less than three feet. By exposing the freight bay 409 to the open air, the mothership 405 provides for easier ingress and egress of the ADUs 410. The ADUs 410 may be configured in some aspects to recognize the configuration of the mothership 405, and to alter their approach course to the mothership 405 based on its configuration. For example, if an embodiment of a mothership includes an opening on one side of the mothership 405, the aerial ADUs 410 may be configured to approach the mothership 405 from that side. If the mothership 405 includes a freight bay that does not have a roof, the ADUs 410 may be configured to approach the mothership 405 from more than one side, for example, from any position 360 degrees around the mothership. For example, the ADUs 410 approach to the mothership 405 may be based on a direction of travel of the ADU 410 from its drop-off or pick-up location to the mothership 405.

In aspects utilizing a mothership without a substantial roof structure or wind shielding structure for the freight bay 409, the ADUs 410 may be secured to the freight bay 409 via a hard coupling device, such as one or more chains, latches, ropes, or other hard coupling device, so as to prevent the displacement of the ADUs 410 from their respective storage locations within the freight bay 409 during high speed travel of the mothership.

Figure 5:
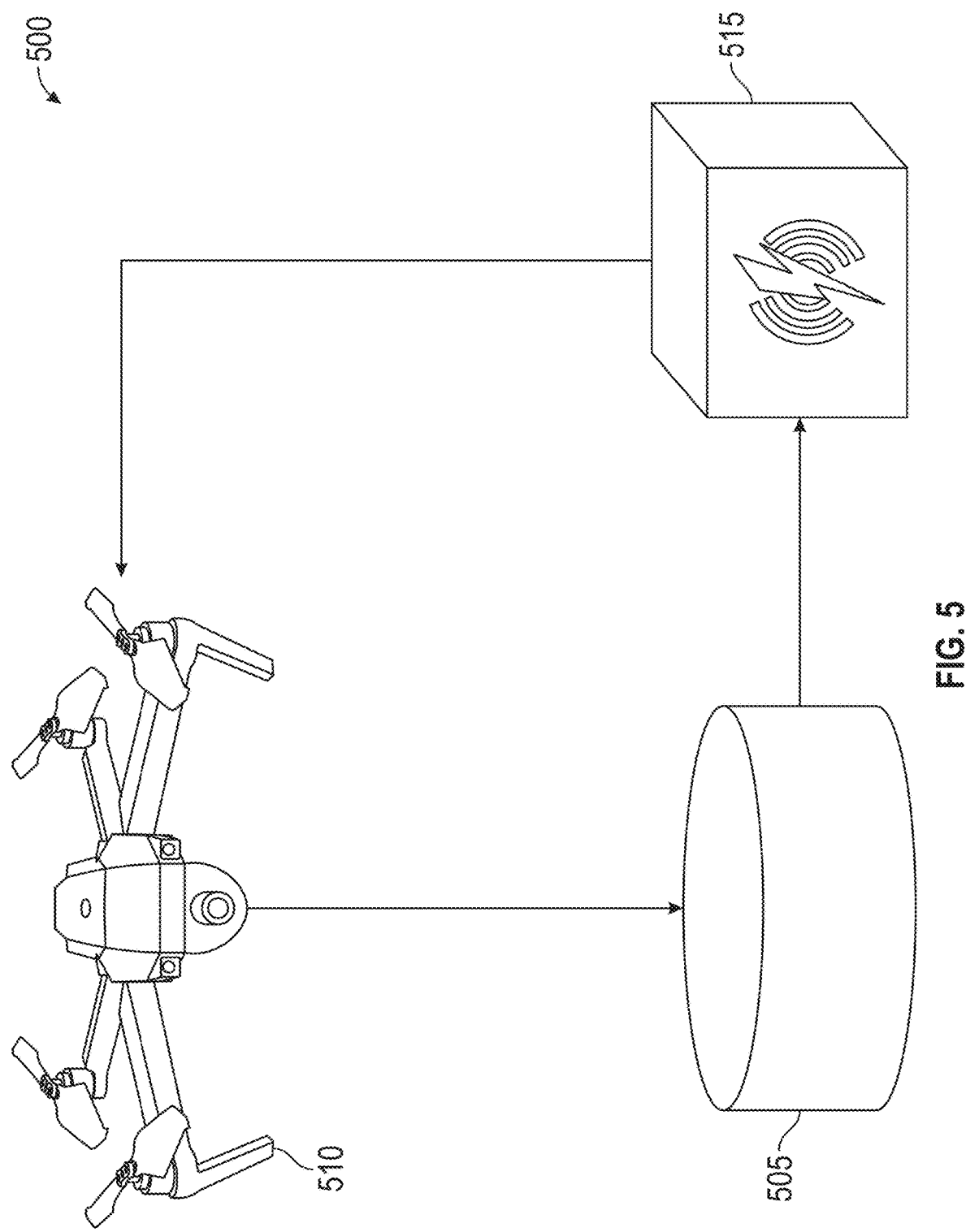
FIG. 5 is a schematic view of an exemplary wireless charging system.

FIG. 5 is an exemplary wireless charging system which may be, for example, the charging systems 320, 420 depicted in FIGS. 3 and 4. The wireless charging system 500 is configured to charge an ADU 510, and includes an active proxy 505 and a wireless power emitter 515. While the ADU 510 depicted in FIG. 5 is an aerial ADU, in some other aspects, the ADU 510 may be ground based. For example, the ADU 510 may be equipped with tires, treads, or tracks for transport over the ground. The ADU 510 may be configured to use an internal sensor to locate the active proxy 505 via a signal emitted by the active proxy 505. For example, in some aspects, the active proxy 505 may be configured to emit an RFID signal that the ADU 510 receives, and uses to locate a position of the active proxy 505. In some aspects, the ADU 110 may be in communication with a database of active proxy locations, and may determine an active proxy within a proximity of a current location of the ADU 510, or within a range reachable by the ADU 510 at the ADUs 510 state of charge. The ADU 510 may then autonomously fly to a location of one of the active proxies 505 indicated in the database. In some aspects, the accuracy of the location information in the database, and/or the accuracy of the ADU's 510 ability to determine its own location, may limit the ability of the ADU 510 to identify an exact location of the active proxy 505, for example, so that the ADU 510 may physically land on top of the active proxy 505 in some aspects. Alternatively, the accuracy limitations discussed above may prevent the ADU 510 from reliability positioning itself within a near enough proximity to one or more of the active proxy 505 and/or the wireless emitter 510, such that the ADU 510 may efficiently receive a charging signal from the wireless emitter 515.

The ADU 510 may communicate to the active proxy that it needs power and the ADU 510 may then enter a low power mode so as to configure itself to accept power. The active proxy 505 may then transmit a signal to the wireless power emitter 515 to command the wireless power emitter to emit power and thus recharge the ADU 510.

The ADU 510 may be configured such that when its charging level reaches a threshold, e.g. 80% or 100%, the ADU 510 sends a signal to the active proxy 505 that charging is complete. The active proxy 505 may then, in response to the signal from the ADU 510, send a separate signal to the wireless power emitter 515 to stop emitting a charging signal.

Figure 6A:
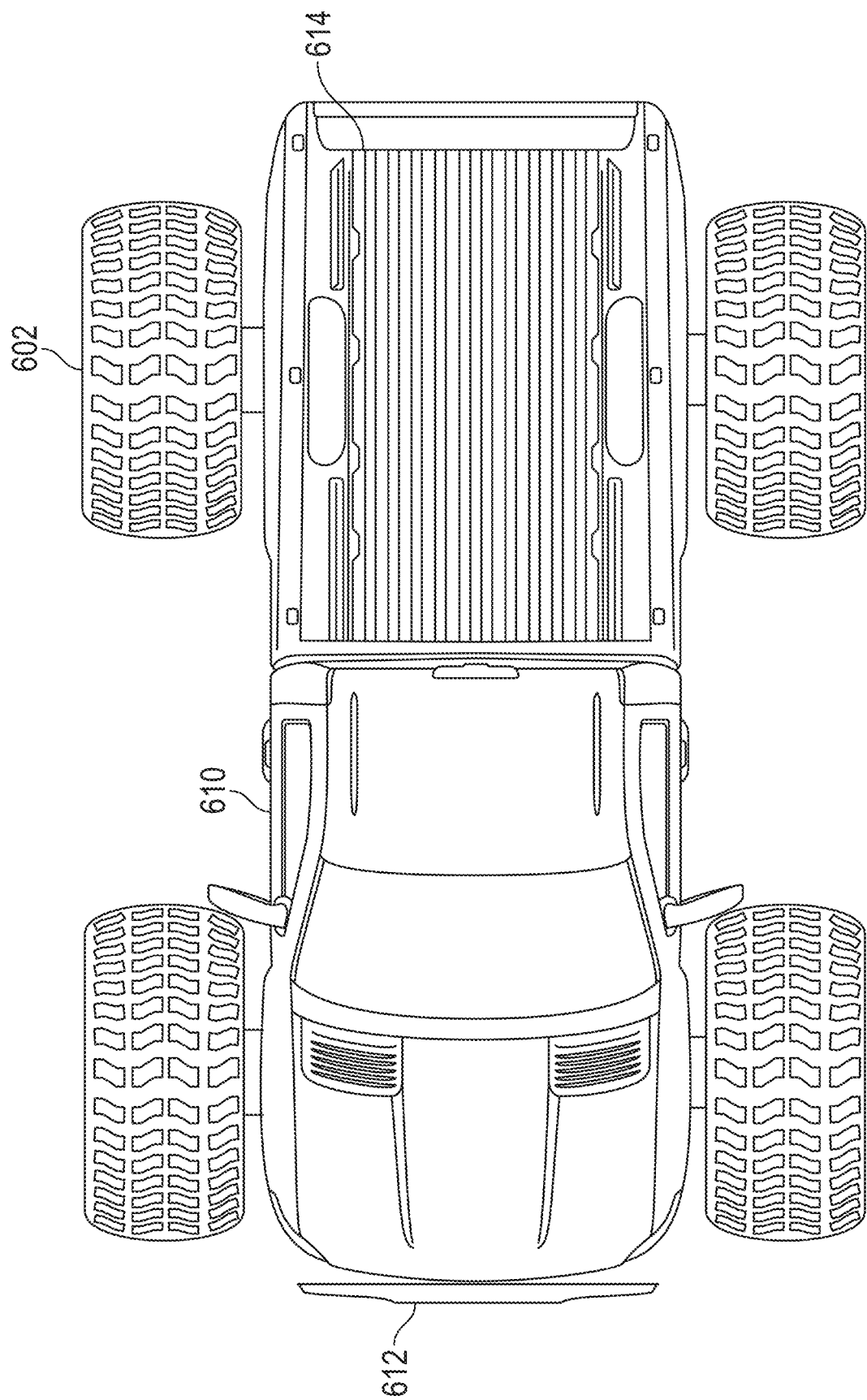
FIG. 6A is a top view of an exemplary embodiment of an ADU.

FIG. 6A is an exemplary embodiment of an ADU 610. The ADU 610 of FIG. 6A is a point to point autonomous, ground-based vehicle, capable of traveling over land. As such, the ADU 510 of FIG. 6A may include tires 602 and an electric motor (not shown) coupled, in some cases via gears, to one or more of the tires 602.

The ADU 610 of FIG. 6A may also include an item loading apparatus 612. In some aspects, the item loading apparatus 612 may be configured as a scoop that is positionable so as to enable the ADU 610 to lift an item from a ground location to a storage position 614 for transport by the ADU 110. In some aspects, the storage position is the scoop itself.

The ADU 610 of FIG. 6A may also include an item storage area or bed 610. The item storage area or bed 614 may be substantially flat in the horizontal dimension and be sized to accommodate items of particular dimensions. In some aspects, the bed 614 may be raised or lowered relative to the ADU 610 to facilitate loading or unloading of items. For example, in some aspects, the bed 614 may function in a manner similar to a dump truck, in that one end of the bed may be liftable to cause an item positioned on the bed to slide off the bed during an unloading operation.

The ADU 610 is capable of autonomous driving, and configured to perform item delivery and/or item drop-off after being provided with item origin/destination information. In some aspects, the ADU 610 may be equipped with a wireless network connection that allows it to receive commands from a mothership 505 (see FIG. 6B). For example, either before or after reaching a location proximate to a particular item drop-off or pick-up location, the ADU 610 may be loaded with one or more items. The loading may be accomplished via a human operator or an automated loading apparatus within the mothership 505, or in some aspects, via the systems described above with respect to FIG. 2. The mothership 505 may send one or more commands to the ADU 610, the one or more commands indicating an item drop-off or pick-up location, and details of the item operation, such as whether an item is to be dropped at the location or picked-up at the location. In some aspects, the ADU 610 may be configured to deliver more than one item in one trip. For example, the mothership 505 may load the ADU 610 with one or more items, and send one or more commands, for example, via a wireless network, to the ADU 610 indicating two or more separate item origin/delivery points, and whether each of the two or more separate item origins or delivery points locations are for an item drop off or pickup. The ADU 610 may then be configured to autonomously carry out the item drop off(s) and/or pick-up operations indicated by the mothership's commands.

Figure 6B:
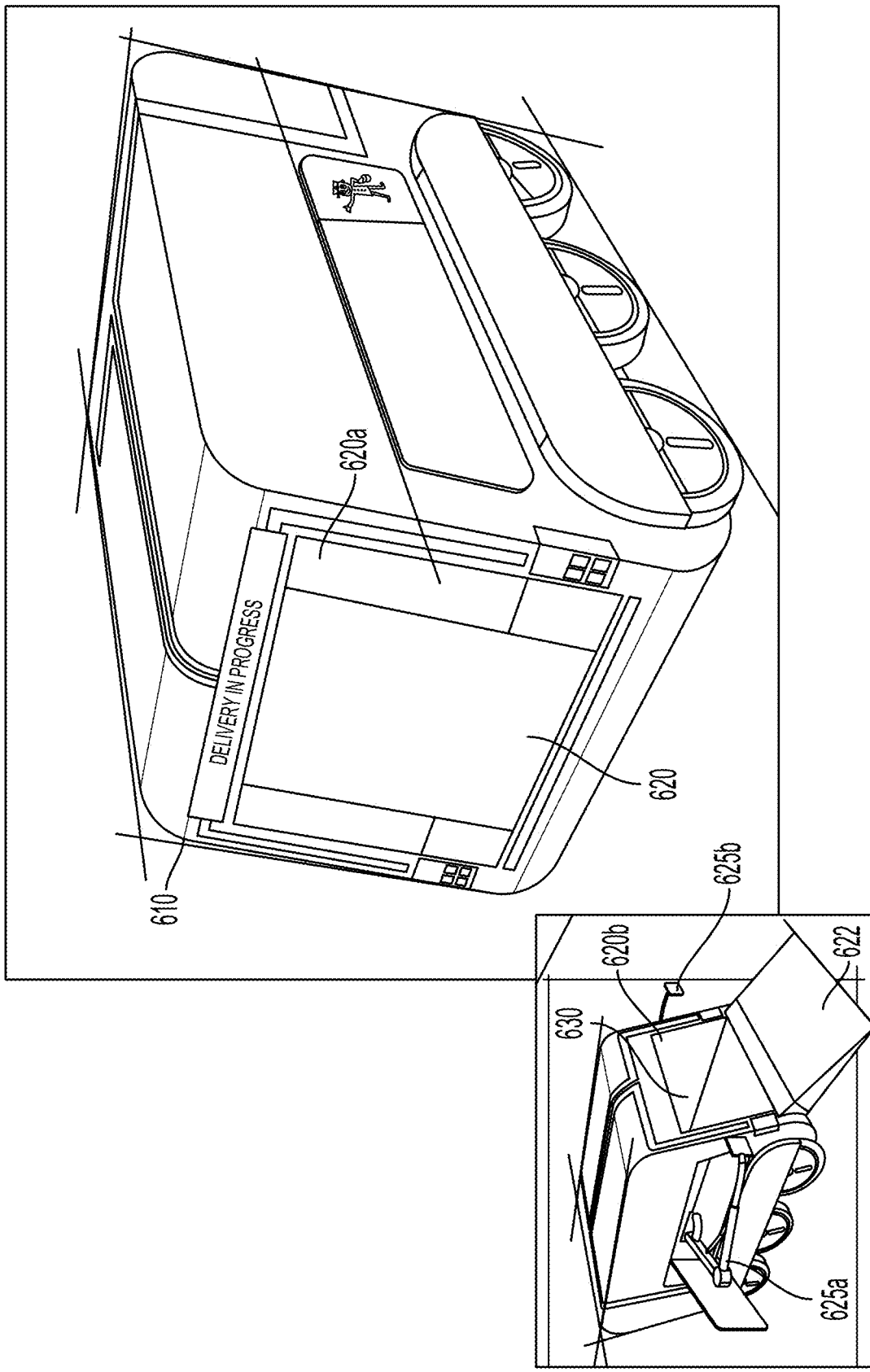
FIG. 6B is a perspective view of an exemplary ADU.

FIG. 6B is a perspective view of an exemplary ADU. The ADU 610 of FIG. 6B includes a rear door 620, shown in both a closed position 620*a* and an open position 620*b*. The ADU 610 may also include loading arms 625*a-b*. The loading arms 625*a-b* may operate so as to load an item into an internal storage bay 630 within the ADU 610. In the open position 620*b*, a ramp 622 can be deployed.

Figure 6C:
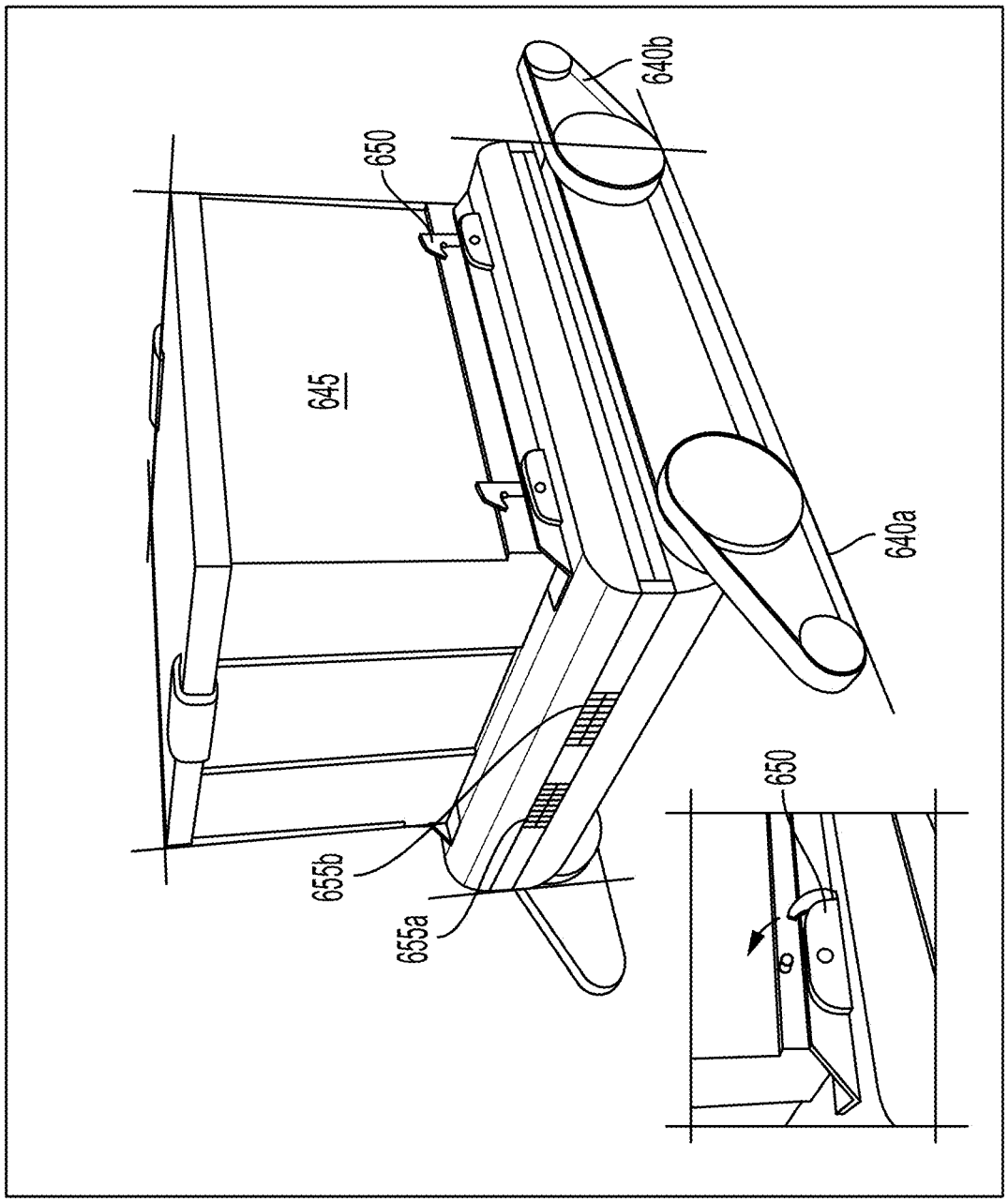
FIG. 6C is a perspective view of an exemplary ADU.

FIG. 6C is a perspective view of an exemplary ADU. The ADU 610 of FIG. 6C may provide for delivery and/or pick up of items over more rugged terrain than some other embodiments of the ADU 610. This more robust delivery and pick-up capability is provided, at least in part, by the asymmetric tracked wheels 640*a-b*. The ADU 610 may secure an item 645 to the top of the ADU 610 via hooks 650.

In some aspects, the ADU 610 of FIG. 6C includes a waterproof seal to protect internal components from the weather. The ADU 610 of FIG. 6C utilizes the hooks 650 in concert with an item casing configured to be secured by the hooks 650.

The ADU 610 is configured to operate in an autonomous manner. The ADU 610 can include ultrasound sensors (not shown). One ultrasound sensor may be positioned at a location closer to the bottom of a frame of the ADU 610 while a second ultrasound sensor may be positioned at a location further from the bottom of the frame than the first ultrasound sensor. The different positions of the ultrasound sensor allows the ADU 610 to detect differences in distance between the two sensors, and as a result of the detection, determine that the ADU may need to deploy arms (not shown) or other maneuvering structures in order to rotate to a 90 degree angle relative to the floor.

Upon touching a stair, a pressure sensor in the ADU 610 (not shown) may provide a signal indicating the ADU 610 should elevate itself so as to make contact with the stair. The ADU 610 then moves up the steps using the angle of the stairs. The ADU may also be equipped with sensors to detect a passive proximity sensor. Upon receiving a signal from the proximity sensor, the ADU 610 may disengage the hooks from the item 645. In some aspects, the hooks 650 may act to push the item 645 off the ADU 610. The ADU 610 may then return to the mothership 205. The ADU 610 may also include lights 655*a-b*.

Figure 7:
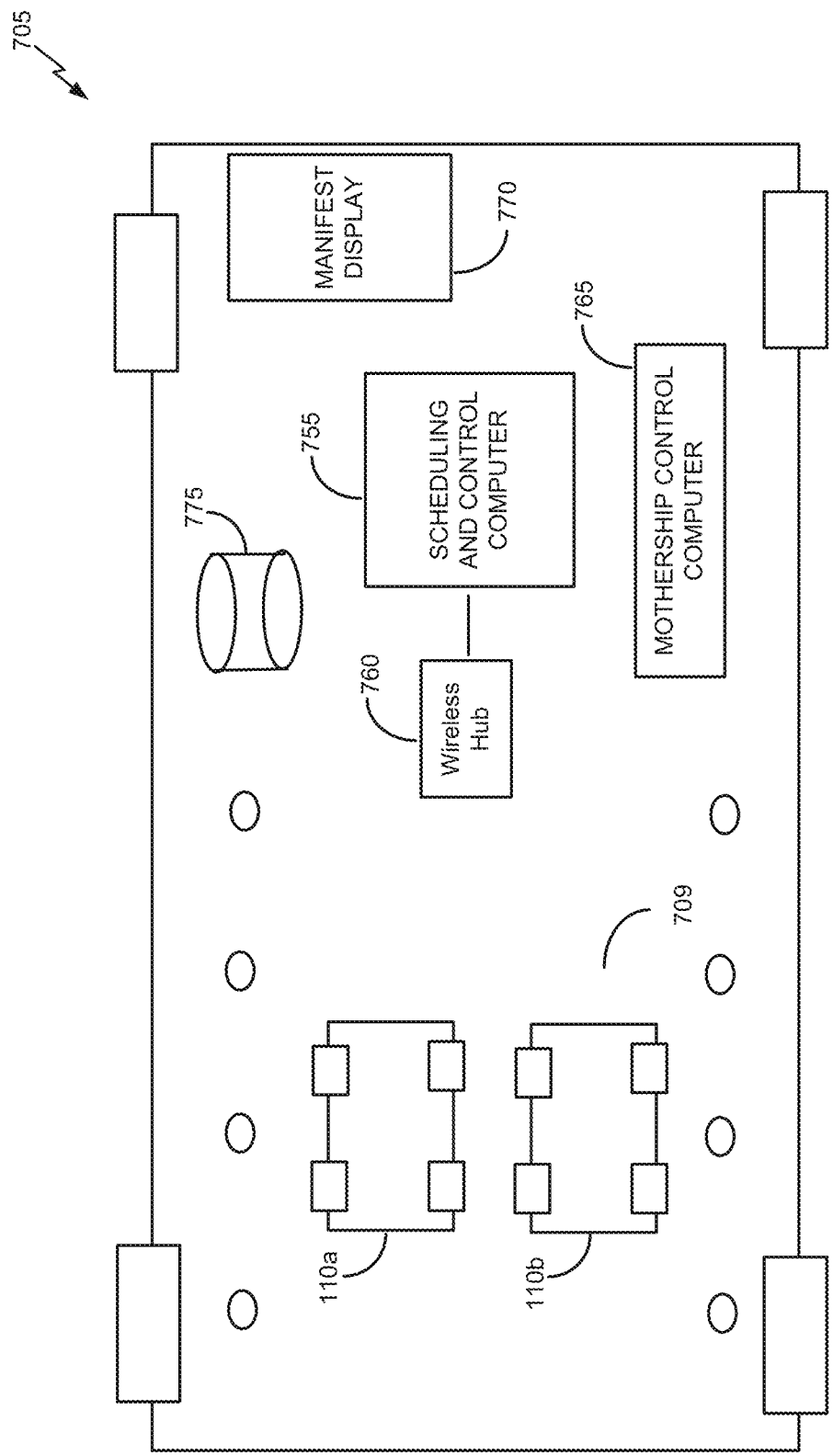
FIG. 7 is a block diagram of an exemplary mothership.

FIG. 7 is an exemplary block diagram of a mothership 705. The mothership 705 of FIG. 7 includes a freight bay 709 including two ADUs 710*a-b*. The mothership 705 also includes a scheduling and control computer 755, wireless hub 760, mothership control computer 765, a manifest display 770, and a memory 775.

In some aspects, the scheduling and control computer 755 is configured to facilitate scheduling and dispatching of the ADUs 710*a-b* to item delivery and/or pick-up in order to execute one or more item transactions. The scheduling and control computer 755 may communicate with the ADUs 710*a-b* via the wireless hub 760. The scheduling and control computer 755 may be configured to display a manifest on the manifest display 770. The scheduling and control computer may communicate with the mothership control computer 765 in some aspects. For example, the scheduling and control computer 755 may indicate to the mothership control computer 765, one or more stop locations to facilitate pick-up and/or delivery of items as indicated by one or more item transactions. The mothership control computer 765 may be configured to autonomously move the mothership 705 according to the indicated stop locations along an item pick-up/delivery route.

The memory 775 can store item and manifest information, including delivery point information for delivery points along a route, or to which item son the mothership 705 are to be delivered; information regarding which items are located on the mothership 705 which are to be delivered and their location within the mothership 705 and the associated delivery points. The memory 775 can also store item information regarding items which have been picked up, including manifest information for these items, including origin, intended destination, item characteristics, etc. The scheduling and control computer 755 and the mothership control computer 765 can be in communication with the memory 775 in order to plan routes, load ADUs 710 and dispatch ADUs 710 to the proper delivery points.

In some aspects, one or more of the scheduling and control computer 755 and/or the mothership control computer 765 may be configured to perform one or more of the functions attributed to it as described herein via instructions that are stored in the memory 775.

Figure 8:
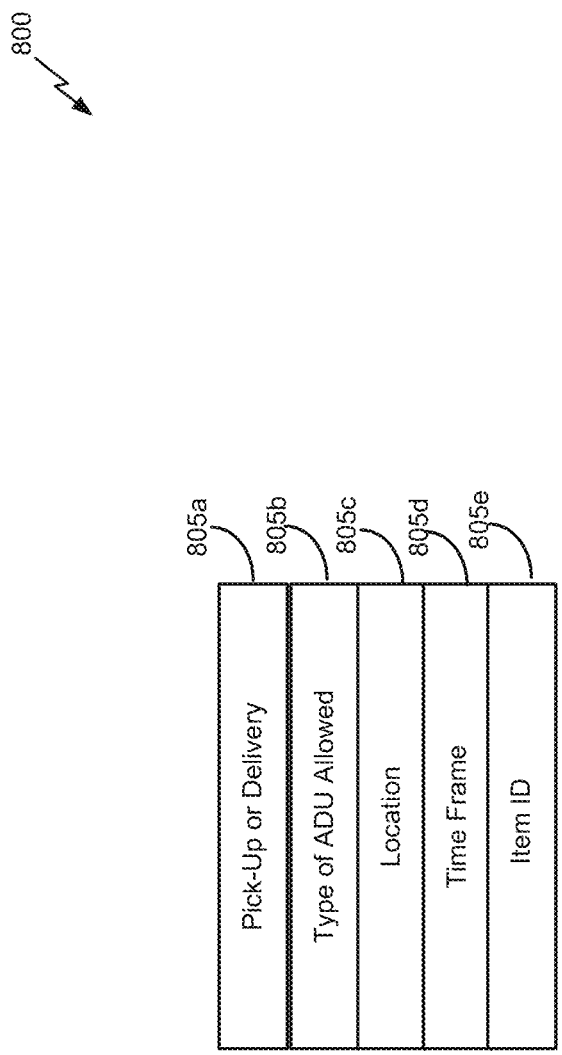
FIG. 8 is an exemplary database table showing the format of an item transaction.

FIG. 8 is an exemplary database table showing the format of an item transaction. The item transaction 800 may include a pick-up or delivery indication 805, a type of ADU allowed indication 805*b*, a location 805*c*, and a timeframe 805*d*. The pick-up or delivery indication may indicate whether the transaction is to deliver an item to an address or to pick-up an item from the address, or must be performed by a human postal carrier. The type indication 805*b* indicates the type of ADU allowed to perform the delivery and/or pickup. For example, the type indication 805*b*, via a series of predetermined values, may indicate one of 1) the transaction must be performed by a human operator, no ADU is allowed for this transaction, 2) only a ground based ADU may be utilized, 3) a ground or flying ADU may be utilized, or 4) only a flying ADU may be utilized.

The location 805*c* may indicate the location for the item transaction 800. In some aspects, the location 805*c* may indicate one or more of an item address, and geographic coordinates.

The time frame 805*d* indicates a time period in which the item transaction should be performed. The item identification 805*e* may indicate an identification number for the item of the transaction. In some aspects, the item identification 805 may be indicated via a barcode affixed to the item. The barcode on the item may be utilized by, for example, ADUs to identify the item for pick-up. In some aspects, the barcode may be utilized within the mothership 105 to load the appropriate item on an ADU for delivery, or to provide the item to a human item carrier for delivery.

Figure 9:
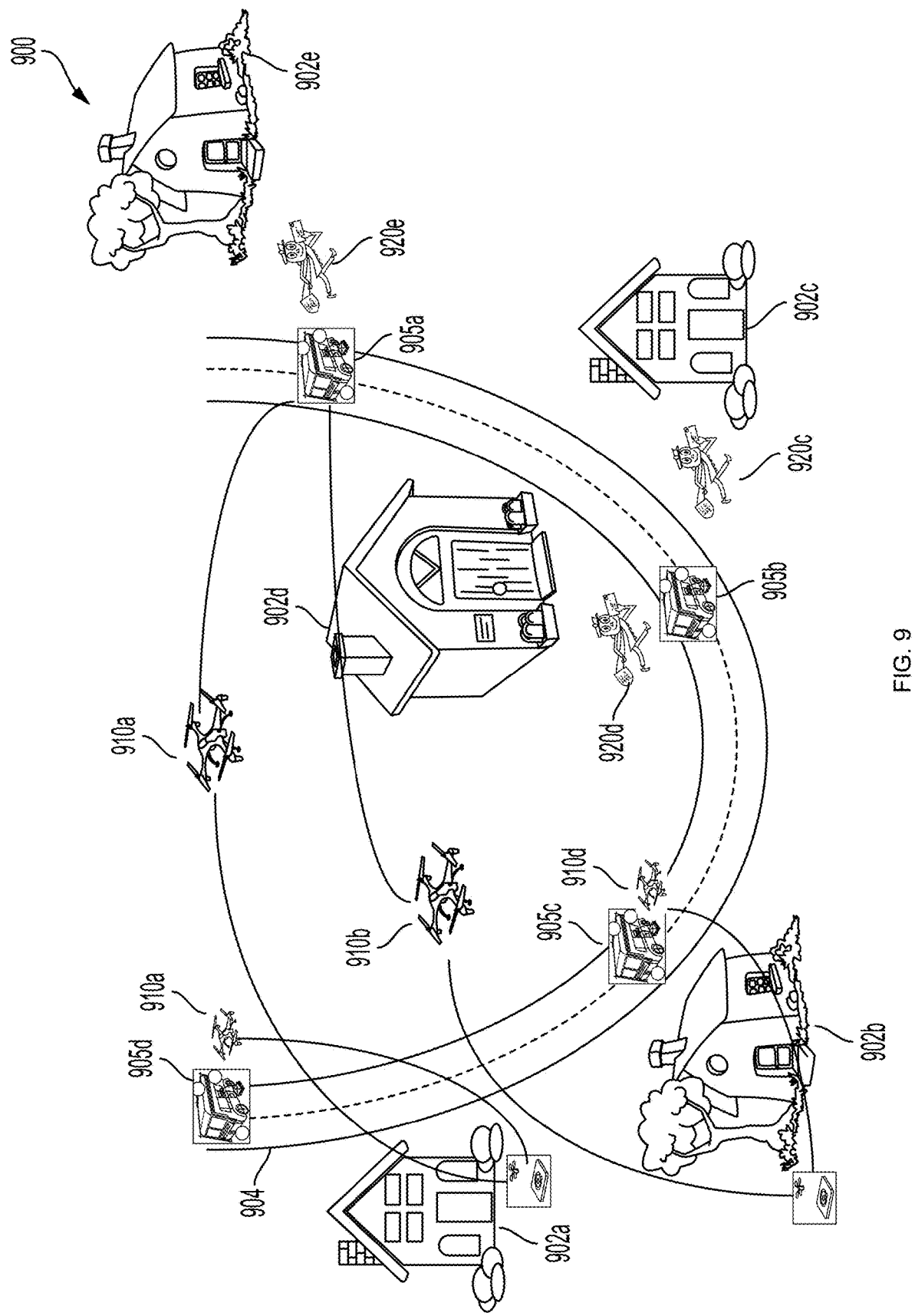
FIG. 9 is an illustration of a mothership on an item delivery and pick-up route employing a combination of ADUs and manual item delivery and pick up to execute a set of item transactions.

FIG. 9 is an depiction of a mothership on an item delivery and pick-up route employing a combination of ADUs and manual item delivery and pick up to execute a set of item transactions. The system 900 shows a delivery route 904 for a set of item transactions for delivery and/or pick-up at the delivery points 902*a-e*. The mothership 905 begins the route at position 905*a*. Position 905*a* may be indicated in the manifest generated by block 1020 of FIG. 10, which will be described elsewhere herein.

In some aspects, the manifest may be a human readable display, either in paper form or on an electronic display. In these aspects, the manifest may assist a human operator of the mothership 905 to position the mothership 905 at positions indicated by the manifest. In some other aspects, the manifest may be in a computer readable form. In these aspects, the manifest may be provided as input to the mothership control computer 765 of FIG. 7. The mothership control computer 765 may then autonomously steer the mothership 105 to various locations indicated by the manifest.

At position 905*a*, in some aspects, a human operator of the mothership 905 may load two ADUs 910*a* and 910*b* with items destined for delivery points 902*a* and 902*b*, which can be farther along the route than the delivery points nearer position 905*a*. In other aspects, the two ADUs 910*a-b* may be loaded via automated means, such as illustrated in FIGS. 2A-2C. The ADUs 910*a-b* may then depart from the mothership 905 and position 905*a* for their item intended delivery points, 102*a* and *b*, respectively. The position 905*a* is also a stopping point for manual delivery and/or pick-up of items 920*e* at delivery point 902*e*. Thus, delivery point 902*e* may be included in the first set of item transactions determined in block 1010 of FIG. 10, as will be described below.

After the manual delivery and/or pick up of items 920*e* at dwelling 902*e* is completed, and the ADUs 910*a-b* have departed the location 910*a*, the mothership 905 may move, either by human operator or autonomously, to position 905*b*. Position 905*b* may be indicated in the manifest generated in block 1020 of FIG. 10. Position 905*b* may facilitate manual pick-up and/or delivery 920*c* of one or more items at the delivery point 102*c*. After the manual delivery and/or pick-up of items 920*c* at delivery point 102*c* is completed, the mothership 905 may move, either autonomously or under control of a human operator, to position 905*c*. Position 905*c* may also be indicated in the manifest produced by block 1020 of FIG. 10. Position 905*c* may be a pick-up location for the ADU 910b, after it makes a delivery and/or picks up an item at delivery point 902b. After the ADU 910b and in some aspects, its item, have been recovered in the mothership at position 905c, the mothership 905 moves to position 905905d, which may also be indicated in the manifest generated by block 1020 of FIG. 10. At position 905d, the ADU 910a, and any items it may have picked-up at dwelling 902a, is recovered and returned to a storage location inside the freight bay of the mothership 905.

Employing a system of ADUs 910 and human carriers can improve the efficiency of completing a delivery route by enabling ADUs 910 to deliver to points along the route that would be more costly or time consuming for a human carrier to reach. In some embodiments, the human carrier can deliver items which are too heavy or bulky for an ADU 910, and the ADUs 910 can deliver items which are smaller or lighter. In some embodiments, although FIG. 9 depicts human carriers, the ADUs 910 and the mothership 905 can complete a delivery route in a similar manner to that shown and described in FIG. 9 without human carriers.

Figure 10:
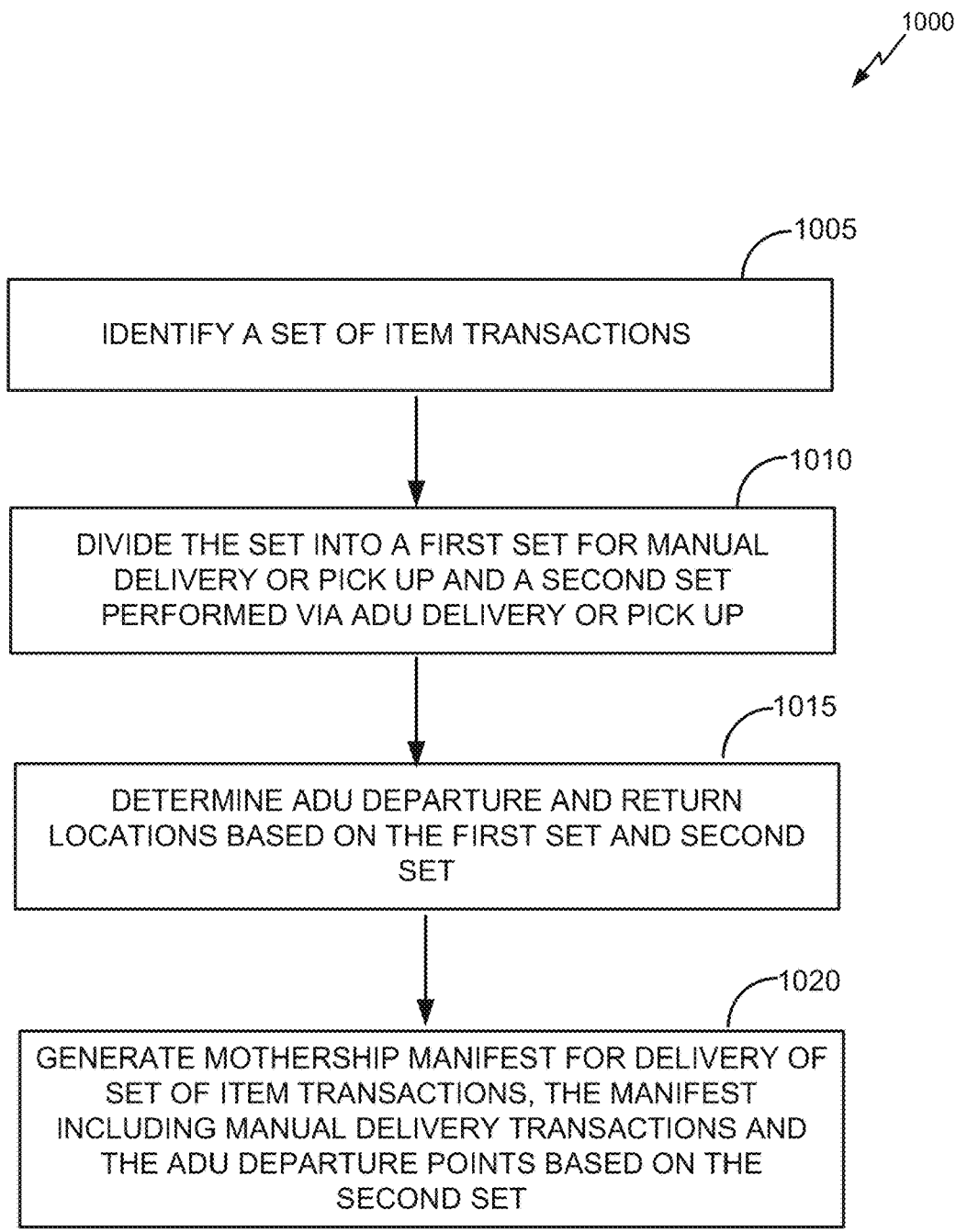
FIG. 10 is a flowchart of a method of scheduling and executing delivery of a set of item transactions.

FIG. 10 is a flowchart of one method of scheduling and executing delivery of a set of item transactions. In some aspects, process 1000 discussed with respect to FIG. 8 may be performed by the scheduling and control computer 755, discussed above with respect to FIG. 7.

In block 1005, a set of item transactions is identified. In some aspects, each transaction in the set of item transactions may include the item transaction record 800 of FIG. 8. In some aspects, the set of item transactions may be identified based on a location of a mothership and origins and/or delivery points for items associated with the set of item transactions. For example, in some aspects, the set of item transactions may be transactions with an origin/destination location within a threshold distance of the mothership location, or a scheduled mothership location.

In block 1010, the set of item transactions is divided into a first set of item transactions to be performed via manual or human delivery and/or pick-up methods, and a second set of item transactions to be performed by ADU delivery or pick-up.

In block 1015, ADU departure and return locations are determined. These may be determined based on the first set and second set of item transactions. In some aspects, block 1015 may determine a first set of mothership stop locations that facilitate completion of the set of manual pick-up and delivery locations. In some aspects, the mothership stop locations may be determined so as to optimize a walkable distance between the transactions in the first set. For example, in aspects where the mothership is driven by a human operator, as the number of stops increases, the amount of time necessary for the human operator to return to the driving controls and move the mothership increases. Furthermore, as the number of stops increases, the amount of time necessary for the human operator to execute the first set of item transactions may decrease, when the time required to drive the mothership is not considered. Furthermore, the position of the stops of the mothership for delivery or pick up of the first set of transactions may seek to provide for reduced time for the human operator to walk to the item origin/destination locations specified in the item transactions of the first set.

Once the stop locations for the first set of item transactions is identified, block 1015 may determine a second set of stops for the second set of item transactions based on a number of parameters. The second set of stops may be based on the first set of stops. For example, it may provide for time savings if a stop for the first set of item transactions is also utilized as a stop for an ADU departure to execute at least one of the item transactions in the second set of item transactions.

The second set of stop locations is also based on the item transactions in the second set. As was the case with determining stops for the first set of item transactions, as the number of stops increases for the second set of item transactions, travel distance for each ADU performing a transaction may be decreased.

The second set of stop locations may be further based on a range of one or more ADUs included in the mothership. The range of each ADU may depend on the ADU model, battery capacity, battery charge state, weight of item to be delivered by the ADU, and the type of ground expected between the stop location of the mothership and the item origin/destination specified in the item transaction. For example, traveling over concrete or asphalt may provide for longer range than traveling over a dirt or grass surface for example.

In block 1020, a manifest is generated for delivery of the set of item transactions, including items in the first and second sets. Portions of the manifest may be displayed on the manifest display 720, discussed above with respect to FIG. 7. For example, the portions of the manifest relating to the first set of item transactions may be displayed, to provide guidance to the human operator as to which items should be manually delivered and where. The manifest may also provide indications of the stop locations discussed above, including stop locations to facilitate delivery/pick up of items in the first set of transactions, and also in some aspects to facilitate drop-off or pick-up of ADUs to facilitate execution of item transactions in the second set. In aspects that rely on the human operator to manually drive the mothership to each stop position. The manifest may also provide indications that allow the human operator to manually load one or more of the ADUs with their appropriate items as indicated by the second set of item transactions.

Figure 11:
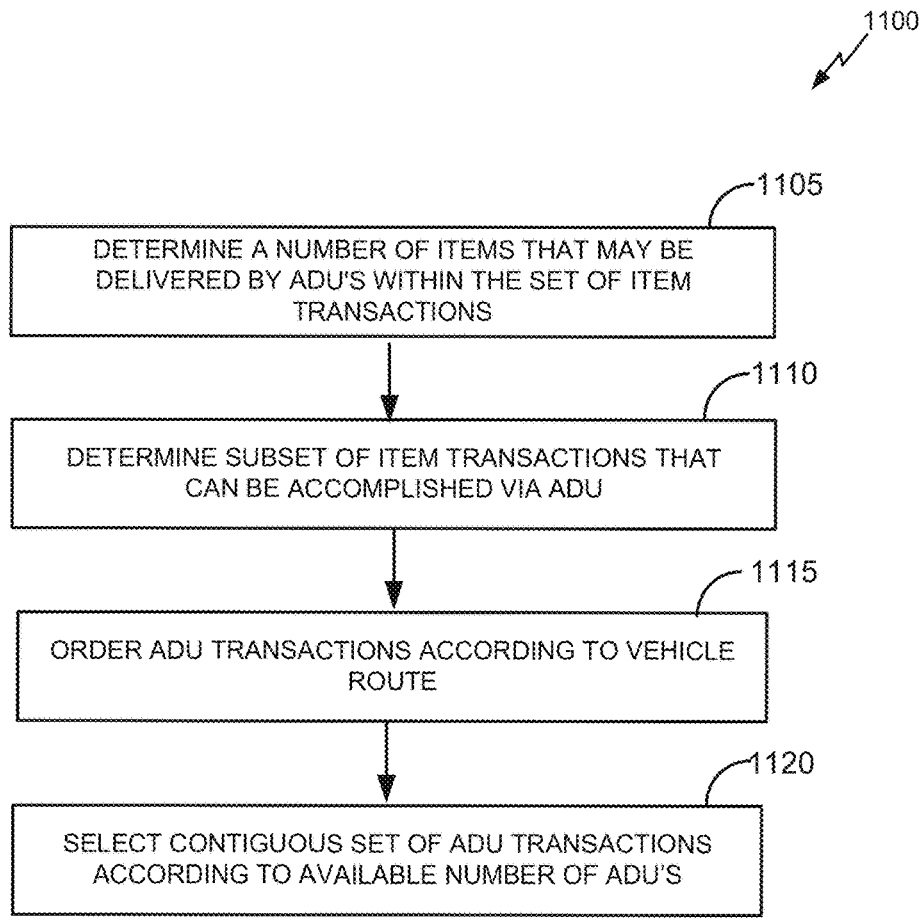
FIG. 11 is a flowchart of a method for dividing a set of item transactions into a first manual set of transactions and a second ADU-assisted set of transactions.

FIG. 11 is a flowchart depicting a process 1100 for dividing a set of item transactions into a first manual set of transactions and a second ADM assisted set of transactions.

In block 1105 a number of ADUs available for delivery is determined. In some aspects, this information may be entered into the scheduling and control computer via a human interface such as a keyboard and/or mouse. In some aspects, the scheduling and control computer 755 may automatically sense the number of ADUs available. For example, ADUs in the freight bay 760 for example may periodically transmit a wireless signal allowing their presence in the freight bay to be detected. In some aspects, this wireless signal (or another) may further indicate the ADU's battery charge level and/or model number, and/or an indication of the ADU's range. These wireless signals transmitted by the ADUs in the freight bay 760 may be received by the wireless hub 760 and forwarded to the scheduling and control computer 755. The scheduling and control computer 755 may then utilize the signals to determine the number of ADUs available for delivery.

In block 1110, a subset of item transactions that can be performed by an ADU is determined. In some aspect, block 1110 receives an input the set of item transactions from block 1005 of FIG. 10. In some aspects, each item transaction may include one or more characteristics associated with the item origin/destination associated with the transactions. In some aspects, the characteristics may indicate whether an ADU may provide delivery/pick-up services at that location. For example, some customers of the distribution network may prefer not to have ADUs perform pick-ups and/or deliveries at their locations, and this may be indicated by the item transaction.

In some aspects, each item transaction record may indicate one or more characteristics of the item origin/destination location. For example, these characteristics may include a number of steps that must be climbed or descended to reach the origin/destination, whether the origin/destination is wheel chair accessible, whether reaching the origin/destination requires manually or automatically opening of a gate, or other characteristics. In some aspects, block 1110 may determine whether the item transaction can be accomplished via an ADU based on one or more of these characteristics.

In block 1115, the ADU capable transactions determined in block 1110 are ordered according to a mothership route of delivery for the set of item transactions of block 1005 of FIG. 10. For example, the ADU capable transactions may be ordered according to a distance from the start of the route. Alternatively, they may be ordered according to a distance from the end of the route.

In block 1120, a contiguous set of ADU transactions from the ordered transactions of block 1115 is selected. In some aspects, the contiguous set of ADU transactions is selected from the portion of the ordered transactions that are closest to the start of the mothership route. In some aspects, the contiguous set of ADU transactions is selected from the portion of the ordered transactions furthest from the start of the mothership route. In some aspects, the contiguous set of ADU transactions is selected from the middle of the ordered list of transactions. The selected set of contiguous ADU transactions is placed in the second set of transactions. The other item transactions from block 1005 of FIG. 10 are included in the first set of transactions, and will be executed via a manual delivery process in some aspects.

Figure 12:
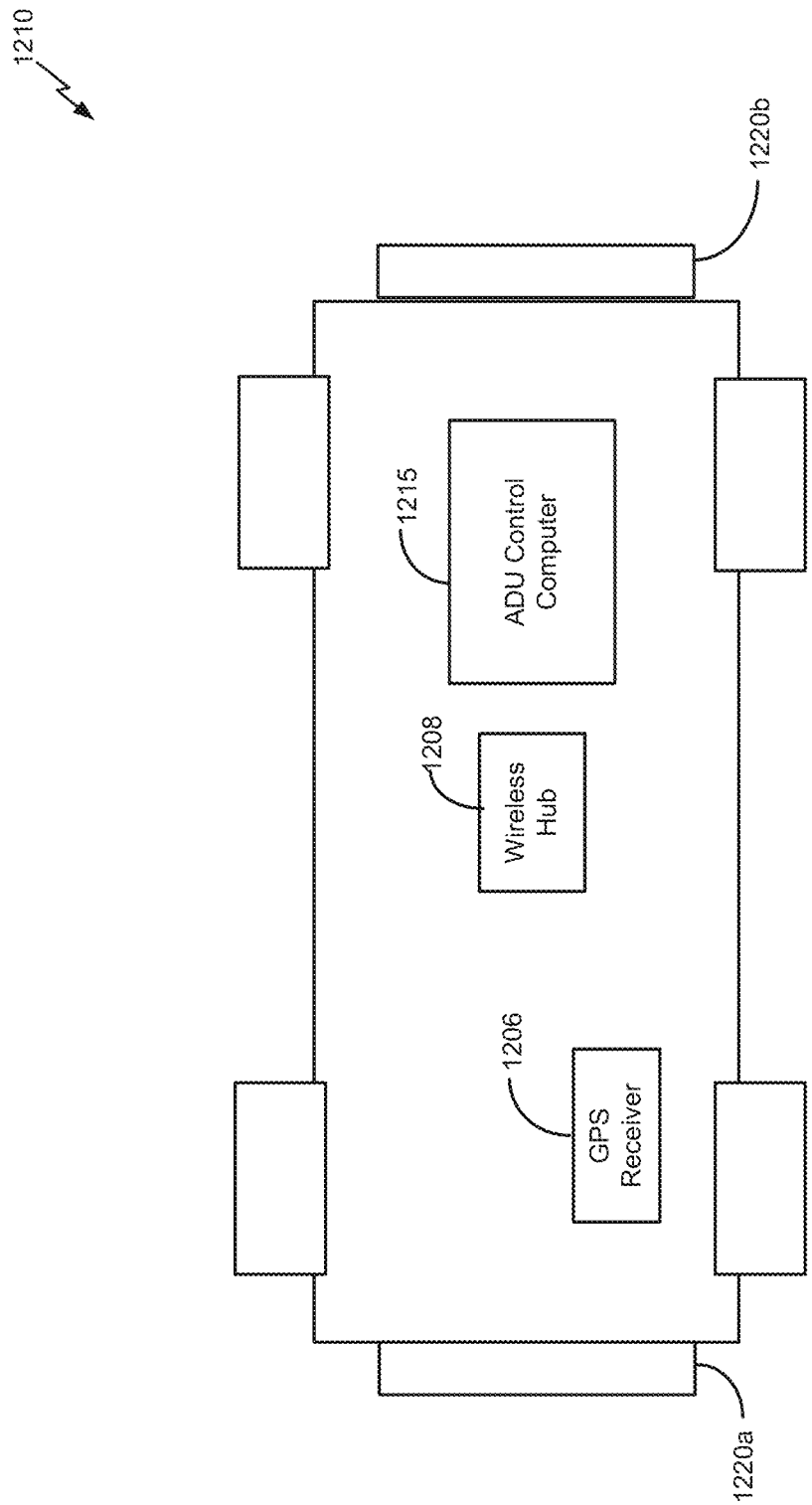
FIG. 12 is a block diagram of an exemplary ADU.

FIG. 12 is a block diagram of an exemplary autonomous delivery unit. The autonomous delivery unit 1210 of FIG. 12 includes a GPS receiver 1206, a wireless hub 1208, and an ADU control computer 1215. The ADU 1210 also include proximity sensors 1220a and 1220b, positioned at the front and rear of the ADU 1210 respectively.

The ADU control computer 1215 may be configured to autonomously deliver and/or pick-up one or more items from an item location, for example, as indicated in the location field 805c discussed above with respect to FIG. 8. The ADU control computer 1215 may receive input from one or more of the GPS receiver 1205 and/or the proximity sensor 1220a-b.

The ADU control computer 1215 may communicate with the scheduling and control computer 755 of FIG. 7A in some aspects. For example, the scheduling and control computer 755 may transmit information to the ADU control computer 1215 regarding a particular item transaction, such as the item transaction 800 shown above in FIG. 8. The ADU control computer 1215 may receive location information for delivery or pick up of an item. The ADU control computer 1215 may then control the ADU 1210 to travel to the location indicated in the item transaction record 800 to deliver or pick up an item. The ADU control computer 1215 may then cause the ADU 1200 to return to the mothership.

Figure 13:
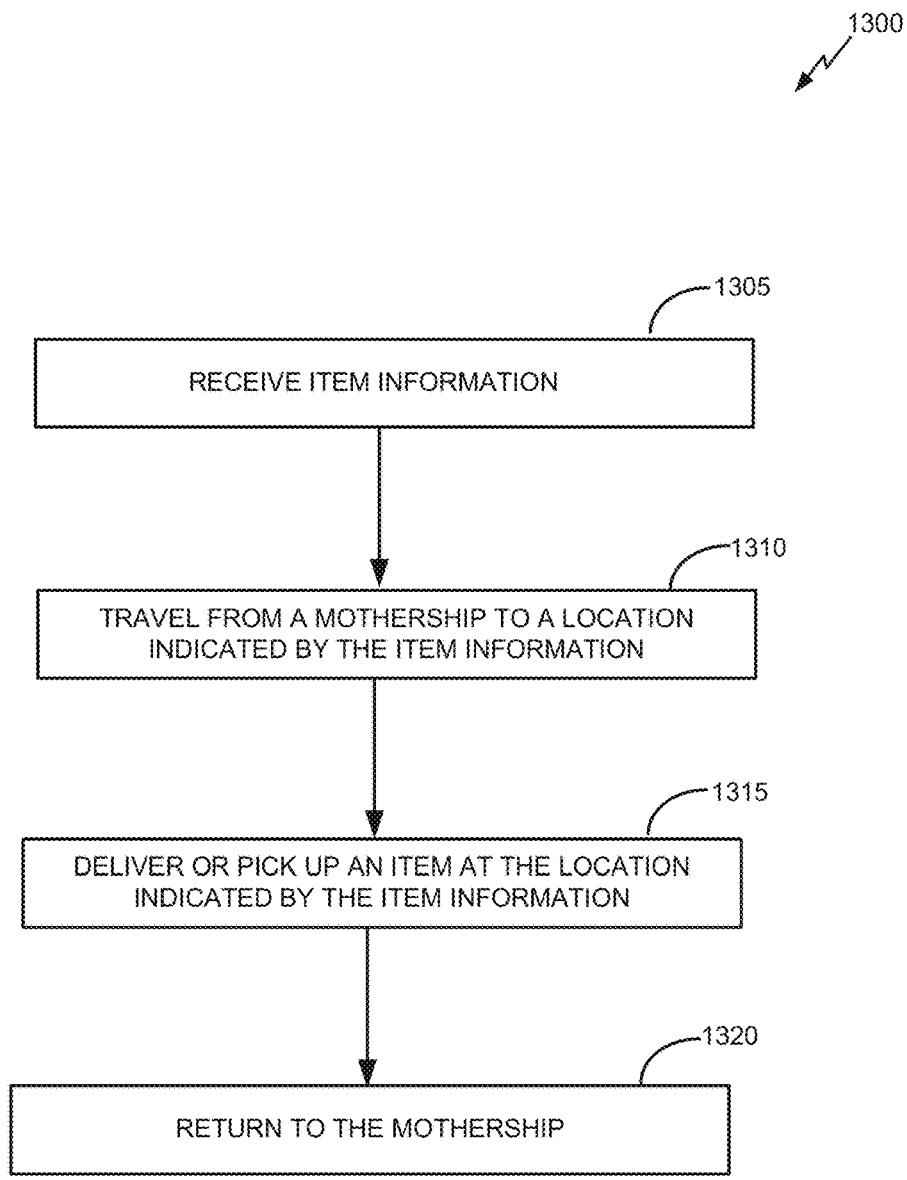
FIG. 13 is a flowchart of an exemplary method for delivering or picking up an item.

FIG. 13 is a flowchart of an exemplary process for delivering or picking up an item. In some aspects, the process 1300 discussed with respect to FIG. 13 may be performed by the ADU control computer 1315, discussed above with respect to FIG. 12.

In block 1305, item information is received. In some aspects, the item information received in block 1305 may include one or more portions of the item transaction record 800, discussed above with respect to FIG. 8. In some aspects, the item information may be received from the scheduling and control computer 755 by the ADU control computer 1215, for example, via the wireless hubs 760 and 1210.

In block 1310, the ADU travels from a mothership to a location indicated by the item information. In some aspects, block 1310 may be performed by the ADU control computer 1315. For example, the ADU control computer 1315 may receive input from the GPS receiver indicating its current position. The ADU control computer 1315 may then command the ADU 110 to travel a route between the current position and the location indicated in the item information received in block 1305.

In block 1315, the item is delivered or picked up from the location. In some aspects, the item may be delivered by activation of a bed tilting mechanism that causes the item to slide from a position on top of the ADU into an item delivery location. In some aspects, an item pick up may be accomplished by the item loading apparatus 612, discussed above with respect to FIG. 6.

In block 1320, the ADU returns to the mothership. In some aspects, block 1320 includes the ADU control computer 1315 receiving GPS location information from the GPS receiver 1205, and navigating the ADU back to a mothership location. In some aspects, the mothership location may be the same location from which the ADU departed the mothership in block 1310. In some aspects, the location may be different. For example, in some aspects, the ADU may receive second location information indicating a location for rendezvous with the mothership. Block 1320 may include navigating the ADU to that location if provided.

Figure 14:
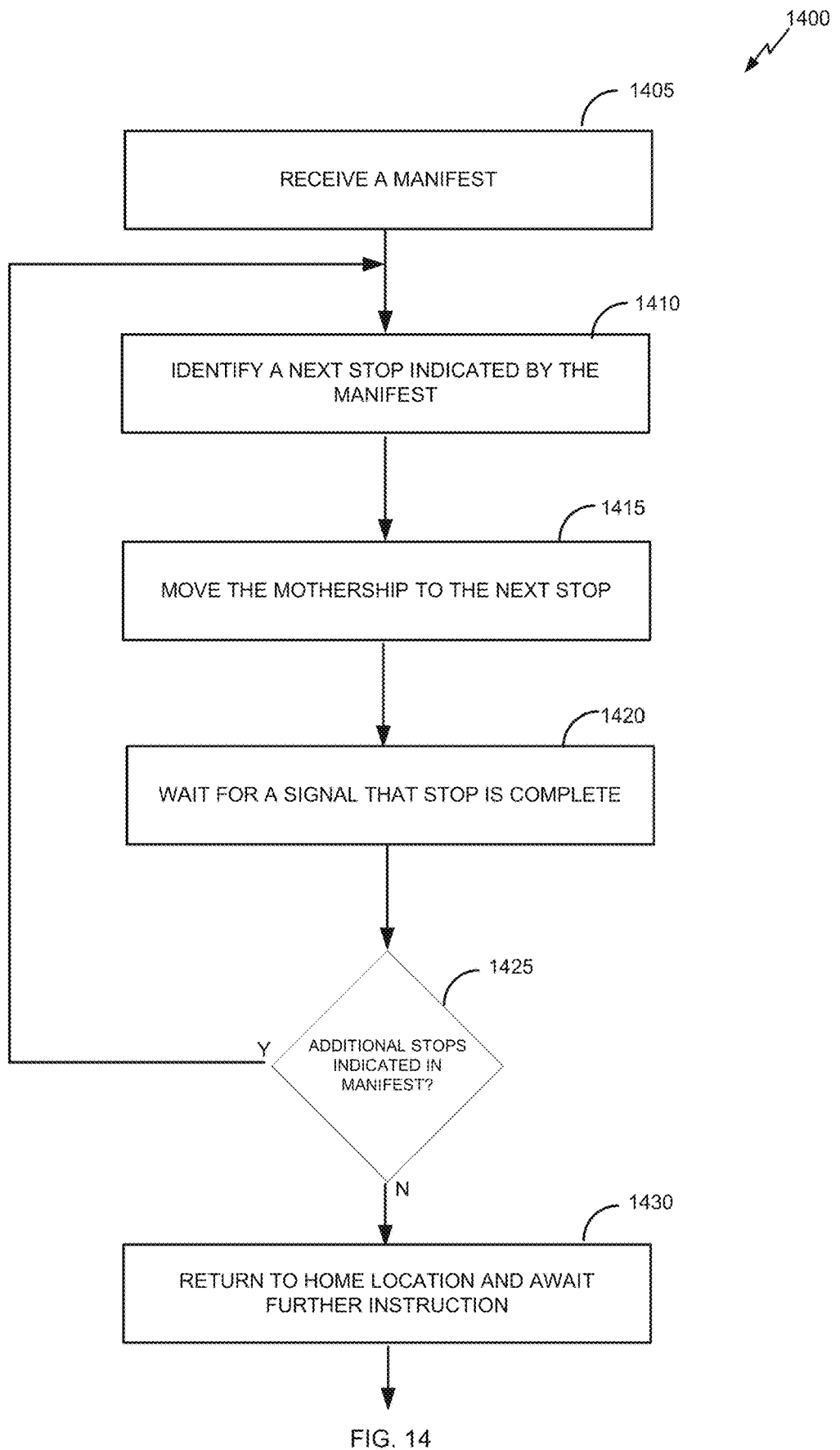
FIG. 14 is a flowchart of an exemplary method for autonomously controlling a mothership.

FIG. 14 is a flowchart of a process 1400 for autonomously controlling a mothership. In some aspects, the process 1300 discussed with respect to FIG. 13 may be performed by the mothership control computer 765.

In block 1405, a manifest is received. In some aspects, the manifest may be received from the scheduling and control computer 755, discussed above with respect to FIG. 7. The manifest may indicate a first and second set of item transactions, with the first set to be performed manually, or via a human item carrier, and a second set to be performed by an ADU. The manifest may also include a number of stops associated with the set of item transactions. The indicated stops may facilitate execution of the item transactions, by placing the mothership within a certain proximity of a location associated with each of the item transactions.

In block 1410 a next stop indicated by the manifest is identified. In some aspects, the item transactions within the manifest may have a particular order corresponding to an order in which the item transactions should be executed. The next stop may correspond to a first stop the first time block 1410 is executed, a second stop the second time block 1410 is executed, and so on.

In block 1415, the mothership is moved to the next stop identified in block 1410. In some aspects, moving the mothership may include autonomously moving the mothership under the control of the mothership control computer 765. In other aspects, moving the mothership may include displaying instructions on a display viewable by a human operator of the mothership. For example, block 1415 may include displaying indications of the next stop to the operator of the mothership via an electronic display. The human operator may then manually move, via traditional controls such as a steering wheel and/or brake and accelerator pedal, to the new location. Block 1420 waits for a signal that the stop is complete. For example, in some aspects, the manifest may indicate one or more item transactions are to be executed at a particular stop. In some aspects, the item transactions to be executed at a particular stop are manual. Thus, block 1420 may wait for a human operator to signal that the stop is complete (for example, after the human operator executes all of the manual item deliveries and/or pickups at this particular stop).

After the stop is completed, process 1400 moves to decision block 1425, where it is determined whether there are additional stops indicated in the manifest. If there are additional stops, process 1400 moves from decision block 1425 to block 1410, where the next stop is identified and processing continues. If there are no additional stops, in some aspects, process 1400 moves to block 1430. In block 1430, the ADU may return to a home location and await further instruction. After block 1430 is completed, processing continues. Block 1430 may not be implemented in some aspects.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

The functions described can be implemented in hardware, software, firmware, or any combination thereof. If implemented in software, the functions can be stored as one or more instructions on a tangible computer-readable medium. A storage medium can be any available tangible medium that can be accessed by a computer. By way of example, and not limitation, such computer-readable media can include RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

A computer program product can perform certain operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by suitable terminals and/or coupled to servers, or the like, to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized. Features implementing functions can also be physically located at various positions, including being distributed such that portions of functions are implemented at different physical locations.

In describing the present invention, the following terminology will be used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but can be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations including, for example, tolerances, measurement error, measurement accuracy limitations and other factors known to those of skill in the art, can occur in amounts that do not preclude the effect the characteristic was intended to provide. Numerical data can be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items can be used alone or in combination with other listed items. The term "alternatively" refers to selection of one of two or more alternatives, and is not intended to limit the selection to only those listed alternatives or to only one of the listed alternatives at a time, unless the context clearly indicates otherwise. The term "coupled" as used herein does not require that the components be directly connected to each other. Instead, the term is intended to also include configurations with indirect connections where one or more other components can be included between coupled components. For example, such other components can include amplifiers, attenuators, isolators, directional couplers, redundancy switches, and the like. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples. As used herein, a "set" of elements is intended to mean "one or more" of those elements, except where the set is explicitly required to have more than one or explicitly permitted to be a null set.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A system for autonomous item delivery, comprising:
   a mothership, comprising:
   a freight bay, configured to store a plurality of autonomous delivery units (ADUs);
   a scheduling and control computer, configured to:
   identify a set of item transactions along an item route, each item transaction comprising a delivery or a pick-up of an item at a delivery point;
   divide the set, based at least in part on item transaction information corresponding to the individual item transactions of the set and on a number of the plurality of ADUs that are available, into a first set of manual item transactions, each manual item transaction corresponding to an item to be delivered or picked up at a delivery point manually by a human operator, and a second set of autonomous item transactions for execution by the plurality of ADUs, wherein to divide the set, the scheduling and control computer is further configured to:
   determine a number of available ADUs;
   determine a subset of the set of item transactions that is ADU capable item transactions based on the item transaction information and the number of available ADUs;
   order ADU capable item transactions of the subset of item transactions within a sequence of delivery points for the item route according to a distance from a start or an end of the item route to a delivery point of each of the ADU capable item transactions of the subset of item transactions;
   identify a contiguous set of item transactions from the ordered ADU capable item transactions of the subset of item transactions, wherein the contiguous set of item transactions is selected from a portion of the ordered ADU capable item transactions that are closest to or furthest from the start of the item route; and
   add the identified contiguous set of item transactions to the second set of autonomous item transactions to be executed by the available ADUs;
   determine ADU departure and return locations based on the first set and the second set;
   generate a mothership manifest indicating the item transactions in the first and second set; and
   communicate the item transactions in the second set to the plurality of ADUs and the plurality of ADUs, each ADU configured to automatically:
   receive item information from the mothership;
   travel from the mothership to a delivery point indicated by the item information deliver or pick-up an item at the delivery point indicated by the item information; and return to the mothership.

2. The system of claim 1, wherein the plurality of ADUs comprise a GPS receiver.

3. The system of claim 1, wherein the mothership further comprises a mothership control computer, configured to autonomously control the mothership along the item route.

4. The system of claim 3, wherein the manifest indicates stop locations for item transactions in the first and second sets, and wherein the mothership control computer is further configured to stop the mothership at the stop locations associated with the first set and second set of item transactions.

5. The system of claim 1, wherein the mothership further comprises manual driving controls to provide a means for an operator to operate the mothership along the item route.

6. The system of claim 1, wherein the mothership further comprises a ramp configured to allow ingress and egress by the ADUs to and from the freight bay.

7. The system of claim 1, wherein the mothership comprises automated loading means for loading an item onto an ADU.

8. The system of claim 1, wherein one or more of the ADUs comprises item loading means or item drop off means.

9. The system of claim 8, wherein the item loading means comprises a scoop.

10. The system of claim 8, wherein at least one of the ADUs comprises a bed, and wherein the item drop off means comprises a bed lifting means.

11. The system of claim 1, wherein the mothership further comprises an item storage system located within the freight bay, and a robotic arm configured to retrieve and store items in the item storage system.

12. The system of claim 11, wherein the mothership further comprises a roof structure substantially enclosing the freight bay, and wherein the roof comprises an access portal to provide ingress and egress of aerial ADUs.

13. A computer-implemented method for automated transfer of items, the method comprising:
    under control of one or more processors of a mothership, the mothership having a plurality of autonomous delivery units (ADUs) located therein,
    identifying a set of item transactions along an item route, each item transaction comprising a delivery or a pick-up of an item at a delivery point;
    dividing the set, based at least in part on item transaction information corresponding to the individual item transactions of the set and on a number of the plurality of ADUs that are available, into a first set of manual item transactions, each manual item transaction corresponding to an item to be delivered or picked up at a delivery point manually by a human operator, and a second set of autonomous item transactions for execution by the plurality of ADUs; wherein dividing the set comprises:
    determining a number of available ADUs;
    determining a subset of the set of item transactions that is ADU capable item transactions based on the item transaction information and the number of available ADUs;

ordering the ADU capable item transactions of the subset within a sequence of delivery points for the item route according to a distance from a start or an end of the item route to a delivery point of each of the ADU capable item transactions of the subset of item transactions;

identifying a contiguous set of transactions from the ordered ADU capable item transactions of the subset of item transactions, wherein the contiguous set of item transactions is selected from a portion of the ordered ADU capable item transactions that are closest to or furthest from the start of the item route; and adding the identified contiguous set of item transactions to the second set of autonomous item transactions to be executed by the available ADUs;

determining ADU departure and return locations based on the first set and the second set;

generating a mothership manifest indicating the item transactions in the first and second set;

communicating a first item transaction of the second set to a first ADU of the plurality of ADUs;

at a first ADU departure location, causing the first ADU to leave the mothership to execute the first item transaction; and at a first ADU return location, causing the mothership to receive the first ADU subsequent to execution of the first item transaction.

14. The computer-implemented method of claim 13, wherein the first ADU return location is different from the first ADU departure location, the method further comprising:

receiving, from the first ADU, a signal indicating that the first item transaction is complete; and sending a signal to the first ADU indicating the first ADU return location.

15. The computer-implemented method of claim 13, wherein the first item transaction comprises a delivery, the method further comprising:

based at least in part on the mothership manifest, causing an automated loading mechanism of the mothership to retrieve a first item from a storage location within the mothership; and causing the automated loading mechanism to load the item onto the first ADU.

16. The computer-implemented method of claim 13, wherein the first item transaction comprises a pick-up, the method further comprising, subsequent to the mothership receiving the first ADU:

causing an automated loading mechanism of the mothership to retrieve a first item from the first ADU; and causing the automated loading mechanism to place the first item into a storage location within the mothership.

17. The computer-implemented method of claim 13, wherein the first ADU is selected from the plurality of ADUs based at least in part on a battery charge status of the first ADU.

18. The system of claim 1, wherein the mothership further comprises an externally accessible automated retail hotspot configured to retrieve and dispense items stored in the mothership or to receive and store items deposited at the automated retail hotspot.

* * * * *